United States Patent
Tanizawa et al.

(10) Patent No.: US 10,716,266 B2
(45) Date of Patent: Jul. 21, 2020

(54) AGRICULTURAL HOUSE

(71) Applicant: PANASONIC INTELLECTUAL PROPERTY MANAGEMENT CO., LTD., Osaka (JP)

(72) Inventors: Takayoshi Tanizawa, Osaka (JP); Shin Matsugi, Kyoto (JP); Naofumi Kodama, Shiga (JP); Shingo Nagatomo, Osaka (JP); Shinya Hirota, Osaka (JP); Yoshifumi Kariatsumari, Osaka (JP); Woo-Hyeun Jeong, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 562 days.

(21) Appl. No.: 14/412,876

(22) PCT Filed: Jun. 12, 2013

(86) PCT No.: PCT/JP2013/003676
§ 371 (c)(1),
(2) Date: Jan. 5, 2015

(87) PCT Pub. No.: WO2014/030280
PCT Pub. Date: Feb. 27, 2014

(65) Prior Publication Data
US 2015/0189840 A1  Jul. 9, 2015

(30) Foreign Application Priority Data

Aug. 23, 2012 (JP) ................ 2012-184429
Apr. 3, 2013 (JP) ................ 2013-077895

(51) Int. Cl.
*A01G 9/14* (2006.01)
*A01G 9/24* (2006.01)

(52) U.S. Cl.
CPC ........... *A01G 9/14* (2013.01); *A01G 9/246* (2013.01); *A01G 9/247* (2013.01); *Y02A 40/268* (2018.01); *Y02A 40/27* (2018.01)

(58) Field of Classification Search
CPC . A01G 9/14; A01G 9/243; A01G 9/16; A01G 9/1438; A01G 9/24; A01G 9/241; A01G 9/246; A01G 9/22
(Continued)

(56) References Cited

U.S. PATENT DOCUMENTS 5,520,236 A * 5/1996 Thomas ............... A01G 9/227
160/120
5,808,294 A * 9/1998 Neumann .......... G05B 19/0426
250/214 AL (Continued)

FOREIGN PATENT DOCUMENTS

CN 102487754 6/2012
JP 10-052175 2/1998
(Continued)

OTHER PUBLICATIONS

Office Action in Chinese Application No. 201380035918.3, with English language translation, dated Nov. 17, 2015.
(Continued)

*Primary Examiner* — Peter M Poon
*Assistant Examiner* — Jeffrey R Larsen
(74) *Attorney, Agent, or Firm* — Greenblum & Bernstein, P.L.C.

(57) ABSTRACT

A water supply apparatus is arranged inside a house body and includes a watering apparatus that performs watering to a cluster of plants from above. The watering apparatus supplies water to the plants and controls an ambient temperature of the plants due to heat transfer utilizing vaporization heat by watering. A control apparatus acquires an (Continued)

environment information including the ambient temperature of the plants from an environment sensor, and performs the watering by driving the water supply apparatus in a watering period determined according to the environment information, and prohibits the watering by the water supply apparatus in an idle period that is set after the watering period so as to obtain a temperature and a humidity appropriate for growth of the plants.

20 Claims, 13 Drawing Sheets

(58) Field of Classification Search
USPC .......................... 47/17, 58.1 R, 1.01 R, 20.1
See application file for complete search history.

(56) References Cited

U.S. PATENT DOCUMENTS

| | | | |
|---|---|---|---|
| 7,096,094 B2* | 8/2006 | Addink | A01G 25/165 |
| | | | 137/78.2 |
| 7,234,270 B2* | 6/2007 | Brault | A01G 9/246 |
| | | | 47/17 |
| 8,151,518 B2* | 4/2012 | Adams | A01G 9/14 |
| | | | 47/82 |
| 8,757,522 B2 | 6/2014 | Tsuji et al. | |
| 2010/0126062 A1* | 5/2010 | Houweling | A01G 9/246 |
| | | | 47/17 |
| 2011/0186646 A1 | 8/2011 | Tsuji et al. | |
| 2013/0308675 A1* | 11/2013 | Sneed | G01N 25/00 |
| | | | 374/121 |

FOREIGN PATENT DOCUMENTS

| | | |
|---|---|---|
| JP | 10-150860 | 6/1998 |
| JP | 11-155389 | 6/1999 |
| JP | 2002-297690 | 10/2002 |
| JP | 2003-289728 | 10/2003 |
| JP | 2005-176721 | 7/2005 |
| JP | 2006-149294 | 6/2006 |
| JP | 2007-300836 | 11/2007 |
| JP | 2010-017093 | 1/2010 |
| JP | 2010-099009 | 5/2010 |
| JP | 2011-120569 | 6/2011 |
| JP | 2011-163661 | 8/2011 |
| WO | 2010/082350 | 7/2010 |

OTHER PUBLICATIONS

U.S. Appl. No. 14/413,065 to Naofumi Kodama et al., which was filed on Jan. 6, 2015.
Search report from PCT/JP2013/003676, dated Aug. 20, 2013.
U.S. Appl. No. 14/413,065 to Kodama filed Jan. 6, 2015.

* cited by examiner

| MEASUREMENT TEMPERATURE | | LESS THAN 10°C | 10 TO 20°C | 20 TO 30°C | 30°C OR MORE |
|---|---|---|---|---|---|
| GROWTH STAGE | BEFORE SPROUTING | 0 L | 0 L | 20 L | 50 L |
| | LESS THAN 10 DAYS AFTER SPROUTING | 0 L | 10 L | 20 L | 50 L |
| | 10 DAYS OR MORE AFTER SPROUTING | 0 L | 20 L | 50 L | 100 L |

321

| APPARATUS | | WATERING APPARATUS | MIST APPARATUS |
|---|---|---|---|
| GROWTH STAGE | BEFORE SPROUTING | 2 HOURS | 1 HOUR |
| | LESS THAN 10 DAYS AFTER SPROUTING | 1 HOUR | 30 MIN |
| | 10 DAYS OR MORE AFTER SPROUTING | 30 MIN | 15 MIN |

322

| MEASUREMENT TEMPERATURE | | OBJECT SENSOR | LESS THAN 10°C | 10 TO 20°C | 20 TO 30°C | 30°C OR MORE |
|---|---|---|---|---|---|---|
| GROWTH STAGE | BEFORE SPROUTING | LOWEST POSITION | 0 L | 0 L | 20 L | 50 L |
| | LESS THAN 10 DAYS AFTER SPROUTING | MIDDLE POSITION | 0 L | 10 L | 20 L | 50 L |
| | 10 DAYS OR MORE AFTER SPROUTING | HIGHEST POSITION | 0 L | 20 L | 50 L | 100 L |

323

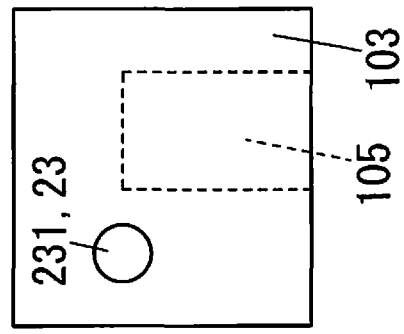
FIG. 16D
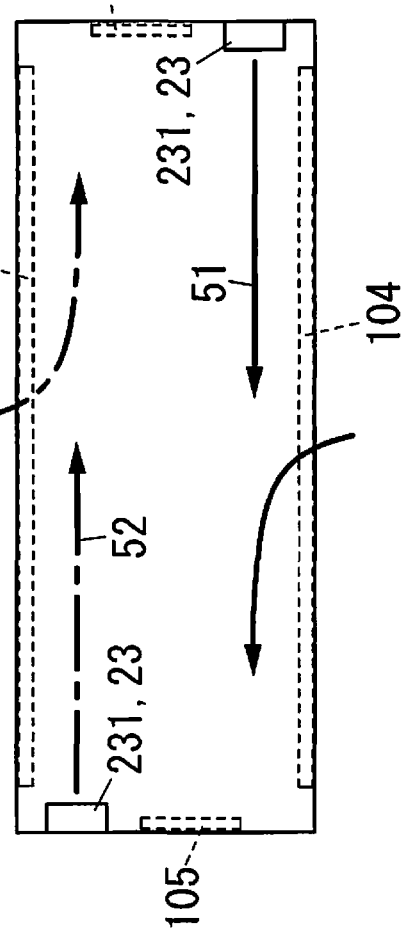
FIG. 16A
FIG. 16C
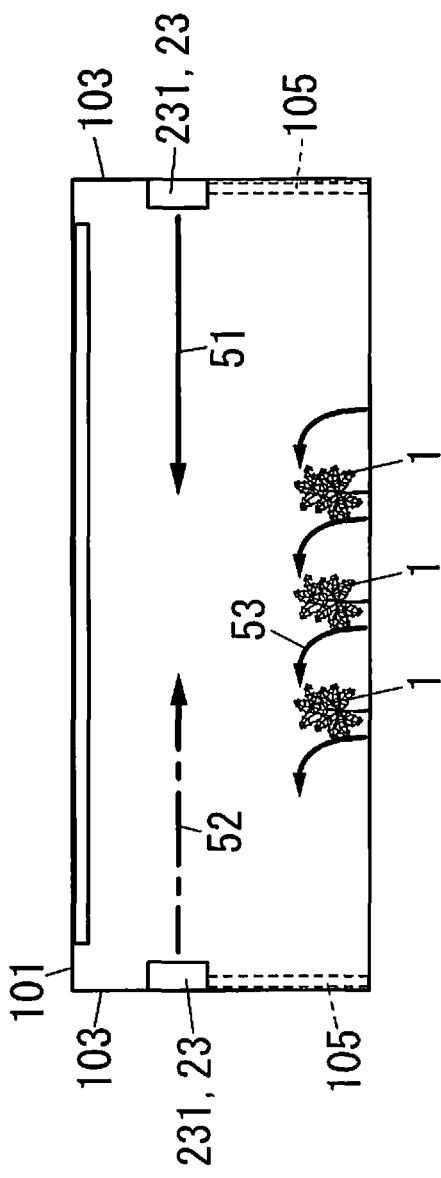
FIG. 16B

AGRICULTURAL HOUSE

TECHNICAL FIELD

The present invention relates to an agricultural house that enables a growth environment for plants to be controlled inside a house body in which the plants are grown.

BACKGROUND ART

Heretofore, greenhouses referred to as vinyl houses or pipe houses have been used so as to enable the growth environment for plants to be controlled when growing plants. This type of agricultural house is used for the purpose of forming a growth environment appropriate for plants by enabling the plant growth environment such as temperature, humidity, light intensity, and the like to be managed while incorporating an external environment by enabling sunlight to enter.

Although, with this type of agricultural house, it has been conceived to have a pipe line for passing a heating medium such as warm water or cold water installed inside the agricultural house in order to manage the temperature of the internal space, there is a problem in that cost increases since a facility for controlling the temperature is required in addition to facilities for watering and ventilation.

On the other hand, in view of the fact that the agricultural house is configured by a frame, which is a structural material, and a covering material to cover the frame, a configuration has been proposed in which an outside surface of the covering material is a hydrophilic-treated surface, and water is made to flow down the outside surface (refer to JP 2007-300836A (hereinafter referred to as "Document 1"), for example). It is described in Document 1 that an effect of suppressing temperature increase inside the agricultural house during the daytime and suppressing temperature decrease during the night can be obtained by causing water to flow on the outer surface of the covering material.

The technique described in Document 1 can conceivably be implemented with a low facility cost compared with a configuration in which a pipe line is provided for passing warm water or cold water only for adjusting an internal temperature of the agricultural house. However, since a watering apparatus for causing water to flow down the outside surface of the agricultural house is required, a facility other than facilities for watering plants and for ventilating the agricultural house is still required. Moreover, the water that flows down the outside surface of the agricultural house is required separately from the water for watering plants, and thus there is a problem in using water only for temperature adjustment in that running costs increase even though a water amount used for this purpose is relatively small.

In particular, since the market price of delicate vegetables such as spinach, komatsuna, and mizuna is relatively low, it could become unprofitable if facility costs or running costs increase. Therefore, it is desired to suppress facility costs and running costs while enabling the growth environment for plants to be controlled.

If temperature control for plants becomes possible at a low cost, plants that are mainly cultivated in the winter could be cultivated in the summer, and plants that are mainly cultivated in the summer could be cultivated in the winter. As a result, it can be expected that the earning rate will improve by increasing the turnover rate of plant cultivation, and that high selling prices will be obtained by shipping in periods of short supply.

SUMMARY OF INVENTION

An object of the present invention is to provide an agricultural house that is provided with a function of controlling an ambient temperature of plants while suppressing an increase in facility costs and running costs relative to a house that is not provided with a temperature control function.

An agricultural house according to the present invention includes: at least one house body, an environment forming apparatus, an environment sensor, and a control apparatus. In the house body, a covering material having translucency is supported by a frame, and a space for plant growth is formed inside. The environment forming apparatus includes a water supply apparatus. The water supply apparatus is configured, by watering a cluster of plants that is grown inside the house body from above, to supply water to the plants and control an ambient temperature of the plants. The environment forming apparatus is configured to form an environment in which the plants are grown. The environment sensor is configured to detect environment information including the ambient temperature of the plants in an internal space of the house body. The control apparatus is configured to acquire the environment information from the environment sensor, and control at least one of a timing and an amount of watering by the water supply apparatus according to the environment information, so as to obtain a temperature and a humidity appropriate for growth of the plants. The control apparatus is configured to perform the watering by driving the water supply apparatus in a watering period determined according to the environment information, and prohibit the watering by the water supply apparatus in an idle period after the watering period.

In the agricultural house, the control apparatus preferably has a function of controlling an operation of the environment forming apparatus that includes the water supply apparatus. The control apparatus is preferably configured to change a control content for controlling the environment forming apparatus according to a season.

Preferably, the agricultural house further includes a temperature sensor for measuring a temperature outside the house body. The control apparatus is preferably configured to determine the season based on a lowest temperature measured by the temperature sensor until sunrise of a current day.

In the agricultural house, the control apparatus is preferably configured to set the at least one of the timing and the amount of watering by the water supply apparatus, such that the ambient temperature of the plants becomes higher than a temperature appropriate for growth in winter.

In the agricultural house, the control apparatus is preferably configured to change the control content for controlling the environment forming apparatus according to a time slot.

In the agricultural house, the control apparatus is preferably configured to change the idle period according to a growth stage of the plants.

In the agricultural house, the control apparatus is preferably configured to change the amount of watering by the water supply apparatus according to a growth stage of the plants.

In the agricultural house, the water supply apparatus preferably includes a watering apparatus and a mist apparatus. The watering apparatus is preferably configured to perform watering so that water is applied directly to the plants. The mist apparatus is preferably configured to spray water into a space above the plants.

In the agricultural house, the at least one house body preferably includes a plurality of house bodies. Preferably, the agricultural house further includes a water supply facility. The water supply facility is preferably configured to supply water to at least one of the watering apparatus and the mist apparatus that are arranged in each of the plurality of house bodies. The water supply facility is preferably configured to be shared by the plurality of house bodies.

In the agricultural house, the control apparatus is preferably configured to select at least one house body to be a target for supplying water from the water supply facility among the plurality of house bodies, according to a relationship between a watering capability of the water supply facility and a water amount needed for each of the plurality of house bodies.

In the agricultural house, preferably, when the at least one house body to be the target for supplying water from the water supply facility includes the plurality of house bodies to be targets for supplying water from the water supply facility, the control apparatus causes the water supply facility to supply water to the house bodies to be the targets for supplying water from the water supply facility in turn, in a case where the total amount of water needed for the house bodies to be the targets for supplying water from the water supply facility exceeds a water supply capacity of the water supply facility.

In the agricultural house, the control apparatus is preferably configured to acquire the environment information from the environment sensor at a position corresponding to a growth stage of the plants.

In the agricultural house, preferably, the environment forming apparatus further includes an airflow forming apparatus. The airflow forming apparatus is preferably configured to form airflow inside the house body in a vicinity of the plants. The control apparatus is preferably configured to control an operation of the airflow forming apparatus in accordance with the at least one of the timing and the amount of watering by the water supply apparatus.

In the agricultural house, preferably, the environment forming apparatus further includes an airflow forming apparatus. The airflow forming apparatus is preferably configured to form airflow inside the house body in a vicinity of the plants. The control apparatus preferably causes the airflow forming apparatus to operate regularly in a range in which the ambient temperature of the plants is maintained at a predetermined temperature in winter or more.

In the agricultural house, preferably, the house body integrally includes a pair of side wall portions, a roof portion, and a pair of gable wall portions. The pair of side wall portions preferably opposes each other. The roof portion preferably extends across the pair of side wall portions. The pair of gable wall portions preferably opposes each other and intersects the pair of side wall portions. Preferably, the environment forming apparatus further includes an openable/closable side window. The openable/closable side window is provided in at least one of the pair of side wall portions. Preferably, the airflow forming apparatus is mounted to at least one of the pair of gable wall portions, and is configured to draw in outside air from the side window when the side window is open, by forming airflow in the house body in a direction passing through the pair of gable wall portions.

In the agricultural house, each of the pair of gable wall portions is preferably provided with an openable/closable end window. The airflow forming apparatus is preferably mounted to each of the pair of gable wall portions. Preferably, the airflow forming apparatuses, which form a pair, are located on opposite sides to each other relative to a center line along a direction passing through the pair of gable wall portions in the house body, and are each arranged so as to face the end window provided in the opposing gable wall portion.

In the agricultural house, preferably, the environment forming apparatus further includes a curtain. The curtain is preferably driven openably/closably between a closed state in which outside light irradiated onto the plants is reduced and an open state in which the outside light irradiated onto the plants is not blocked. Preferably, the airflow forming apparatus is arranged above the plants, and, in the closed state of the curtain, is positioned on an opposite side to the roof portion with the curtain interposed therebetween.

In the agricultural house, the side window and the end window are preferably driven openably/closably. Preferably, the control apparatus is configured to control opening/closing of the side window, opening/closing of the end window, and an operation of the airflow forming apparatus, based on the environment information detected by the environment sensor.

In the agricultural house, the airflow forming apparatus mounted to the gable wall portions preferably includes a body apparatus and a mounting frame. The body apparatus is preferably configured to form the airflow. The mounting frame is preferably fixed to the gable wall portions. In the mounting frame, a position to which the body apparatus is coupled to the mounting frame is preferable changeable.

In the agricultural house, the airflow forming apparatus mounted to the gable wall portions preferably includes a plurality of ventilation fans or air blowers each having an axial flow fan. Axis lines of rotating axes of the axial flow fans are preferably arranged on a straight line.

Preferably, the agricultural house further including a curtain. The curtain is preferably configured to be driven openably/closably between a closed state in which outside light irradiated on the plants is reduced and an open state in which the outside light irradiated on the plants is not blocked. The control apparatus is preferably configured to drive the curtain so as to be open or closed in accordance with the at least one of the timing and the amount of watering by the water supply apparatus.

In the agricultural house, the control apparatus preferably includes a communication interface unit. The communication interface unit is preferably configured to acquire weather forecast information from outside. The control apparatus is preferably configured to determine a plan of the at least one of the timing and the amount of watering by the water supply apparatus, by predicting the ambient temperature from the weather forecast information acquired via the communication interface unit.

In the agricultural house, the environment sensor is preferably configured to detect at least one of humidity and light intensity inside the house body as the environment information in addition to the ambient temperature of the plants.

In the agricultural house, the water supply apparatus preferably includes a chiller. The chiller is preferably configured to adjust a water temperature.

According to the present invention, since the water supply apparatus is configured to supply water to the plants and control the ambient temperature of the plants, there is an advantage of suppressing an increase in facility costs relative to a house that is not provided with a temperature control function is suppressed while having a function of controlling the ambient temperature of the plants. Further, since the water supply apparatus is configured to not only perform watering to the plants but also control the ambient temperature of the plants, there is an advantage of suppressing running costs.

BRIEF DESCRIPTION OF DRAWINGS

Preferable embodiments according to the present invention will be described in more detail. Other features and advantages of the present invention will be better understood with reference to the following detailed description and the attached drawings:

FIG. 16A is a plan view of an exemplary arrangement of ventilation apparatuses used in the agricultural house according to the embodiment, FIG. 16B is a vertical cross-sectional view of the exemplary arrangement of the ventilation apparatuses used in the agricultural house according to the embodiment, FIG. 16C is a left side view of the exemplary arrangement of the ventilation apparatuses used in the agricultural house according to the embodiment, and FIG. 16D is a right side view of the exemplary arrangement of the ventilation apparatuses used in the agricultural house according to the embodiment;

DESCRIPTION OF EMBODIMENTS

Figure 2:
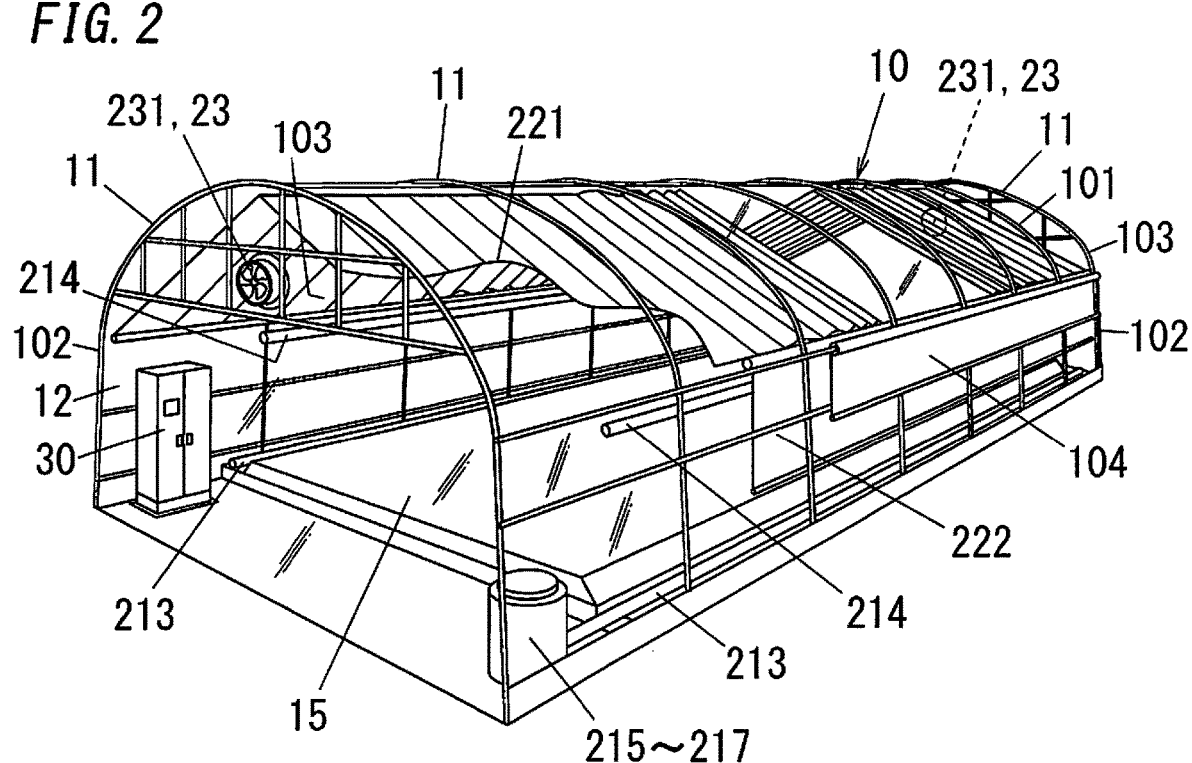
FIG. 2 is a perspective view illustrating an outward appearance of the agricultural house according to the embodiment.

An agricultural house described below includes a house body aimed at preparing an environment for growing plants. The house body 10 includes, as shown in FIG. 2, a frame 11 that is configured by combining metal pipes, which are structural materials, and a covering material 12 that is supported by the frame 11. A translucent (desirably transparent) synthetic resin film is used for the covering material 12. A space for plant growth is formed inside the house body 10.

The house body 10 integrally includes a roof portion 101, a pair of side wall portions 102 opposing each other and supporting the roof portion 101, and a pair of gable wall portions 103 opposing each other and orthogonal (intersecting) to the side wall portions 102. Hereinafter, a direction passing through the pair of gable wall portions 103 is referred to as the longitudinal direction (first direction), a direction passing through the pair of side wall portions 102 is referred to as the short direction (second direction), and a direction that is orthogonal to both the first direction and the second direction is referred to as the third direction. The house body 10 is formed in an inverted U-shape in section viewed from the first direction. The roof portion 101 is formed in a semicircular shape in section viewed from the first direction, and extends between the pair of side wall portions 102. The house body 10 described above is an example, and the configuration of the house body 10 is not limited thereto. Other materials can be used for the house body 10, and the house body 10 may be formed in a different shape.

Figure 3:
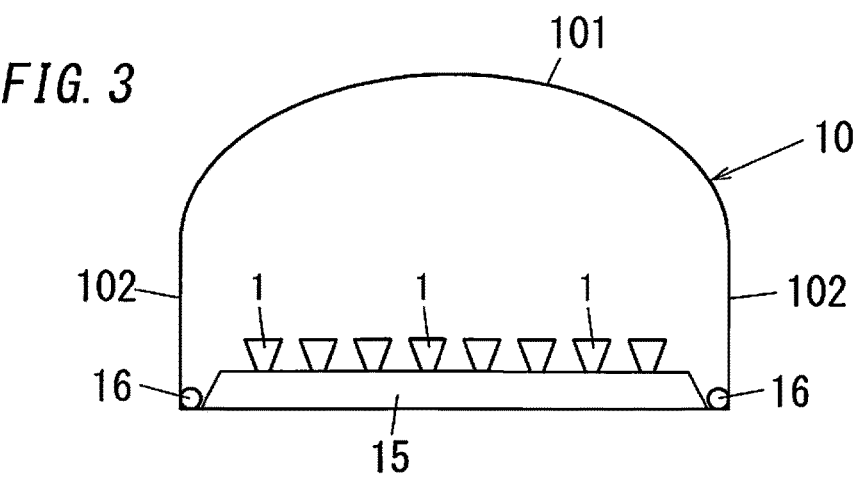
FIG. 3 is a cross-sectional view of the agricultural house according to the embodiment.

A worked soil portion 15 in which soil is heaped up to a height higher than the surrounding soil is formed in the house body 10, as shown in FIG. 3. Plants 1 are sowed in an upper surface of the worked soil portion 15, and are grown from seeds until harvest time. Note that the height to which the worked soil portion 15 is heaped up (that is, worked soil depth) is determined according to the type of plants 1. Also, there is a case in which the worked soil portion 15 is not heaped up according to the type of the plants 1 and the growth conditions, and there is also a case in which seedlings that were grown separately without being sowed in the worked soil portion 15 is planted in the worked soil portion 15. Moreover, even in a case in which soil for growing plants is contained in a container without forming the worked soil portion 15, the technique described below can be adopted.

It is envisioned that the plants that are grown in the house body 10 will be delicate vegetables (vegetables that spoil quickly after harvest) such as spinach, komatsuna, and mizuna. These delicate vegetables are generally cultivated from the fall to the spring when the air temperature and the soil temperature are relatively low. An object of the agricultural house described below is to enable these delicate vegetables to also be cultivated in seasons when the temperature is higher as well.

Figure 5:
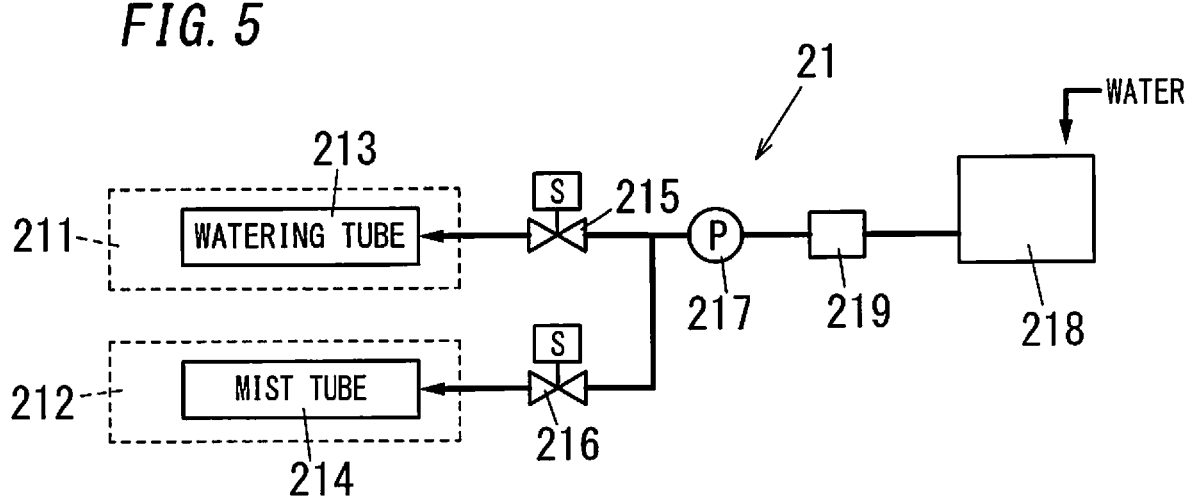
FIG. 5 is a configuration diagram illustrating the water supply apparatus used in the agricultural house according to the embodiment.

Incidentally, a water supply apparatus 21 shown in FIG. 5 is provided for watering a cluster of the plants 1 that is grown in the house body 10. In the present embodiment, the water supply apparatus 21 includes a watering apparatus 211 and a mist apparatus 212 that have different modes of supplying water. The watering apparatus 211 performs watering so as to apply water directly to the plants 1, and the mist apparatus 212 sprays water to the space above the plants 1.

The watering apparatus 211 includes a watering tube 213, as shown in FIG. 2. The watering tube 213 has a plurality of small watering holes formed in the tube wall of the tube through which water is passed, and is configured such that water is ejected like a shower or a fountain through the watering holes when water is passed through the tube. The diameter and the direction of the watering holes formed in the watering tube 213 are designed such that watering is performed approximately uniformly in a range determined according to the water pressure inside the tube. The watering tube 213 is formed by a flexible material that expands when water passes through and contracts when water is not passing through.

Figure 4:
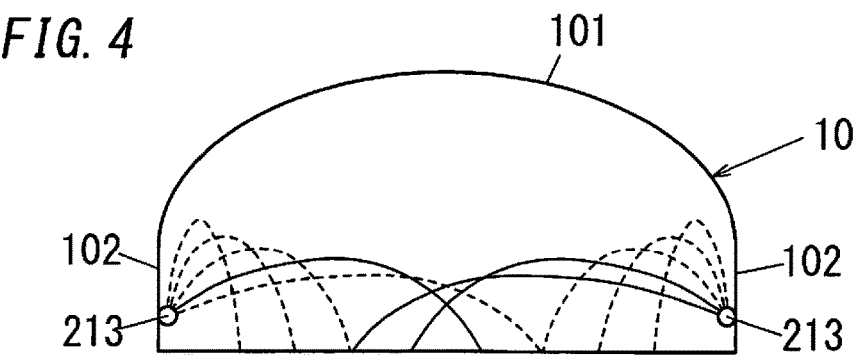
FIG. 4 is a diagram illustrating an exemplary operation of a water supply apparatus used in the agricultural house according to the embodiment.

The arrangement of the watering tube 213 is determined according to the size and the shape of the agricultural field formed in the house body 10. Two watering tubes 213 are used in the example shown in FIG. 2. The watering tubes 213 are respectively installed along the pair of side wall portions 102 of the house body 10 over substantially the whole length of the house body 10 in the longitudinal direction. Furthermore, the watering tubes 213 are arranged such that water is ejected obliquely upward. Accordingly, the water ejected from the watering tube 213 traces a parabola and falls on the worked soil portion 15 and the plants 1 from above, as shown in FIG. 4. Note that a configuration may be adopted in which watering is performed on the worked soil portion 15 from above by arranging the watering tube 213 above the worked soil portion 15.

Here, since the watering tube 213 is formed by a flexible material, when the water pressure inside the tube decreases after water is no longer passed through, the tube starts to contract and eventually water stops being ejected from the watering tube 213, and the water remaining in the watering tube 213 flows out around the watering tube 213. Therefore, the periphery of the watering tube 213 tends to become wet, and the plants 1 close to the watering tube 213 can be supplied with too much water. Also, if the plants 1 are planted so as to not be affected by water flowing in the vicinity of the watering tube 213, the planting area in the house body 10 could possibly be reduced.

Figure 6A:
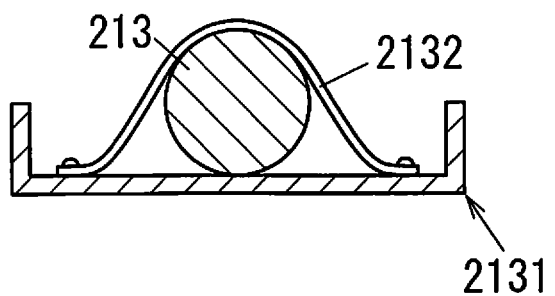
FIG. 6A is a cross-sectional view of a main portion of the agricultural house according to the embodiment.
Figure 6B:
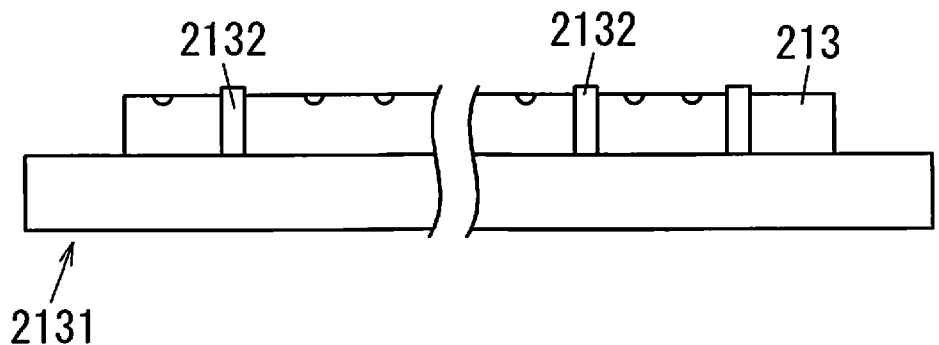
FIG. 6B is a side view of the main portion of the agricultural house according to the embodiment.

Therefore, it is desirable that a water receiver 2131 having a gutter shape is arranged under the watering tube 213 such that water does not flow out around the watering tube 213, as shown in FIGS. 6A and 6B. The water that is not ejected from the watering tube 213 and flows out in the vicinity of the watering tube 213 is guided by the water receiver 2131 to a place where the plants 1 are not affected. The watering tube 213 may be fixed to the water receiver 2131 by belts 2132 at appropriate places.

Figure 7A:
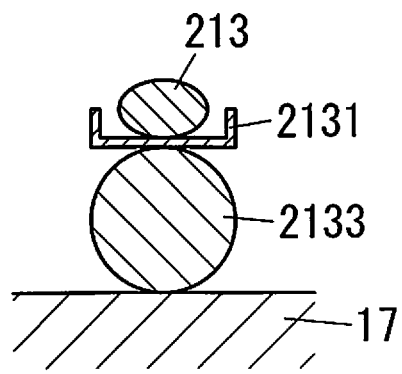
FIGS. 7A and 7B are cross-sectional views of a main portion of another exemplary configuration of the agricultural house according to the embodiment.
Figure 7B:
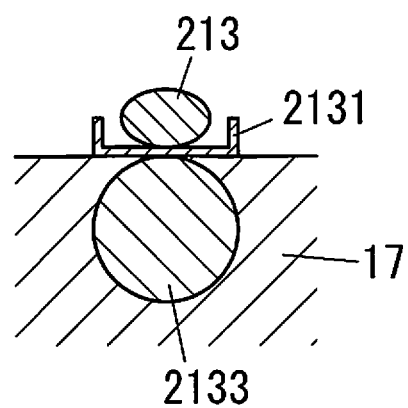

The water receiver 2131 does not affect the planting area in the house body 10 if the water receiver 2131 is placed on the water supplying tube 2133 that is installed in the house body 10, as shown in FIG. 7A, due to the watering tube 213, the water receiver 2131, and the tube 2133 being arranged vertically (third direction). Note that the tube 2133 needs not to be exposed on the ground, and by embedding at least part of the tube 2133 in a ground 17 of the house body 10, as shown in FIG. 7B, the height of the watering tube 213 can be reduced.

Figure 8A:
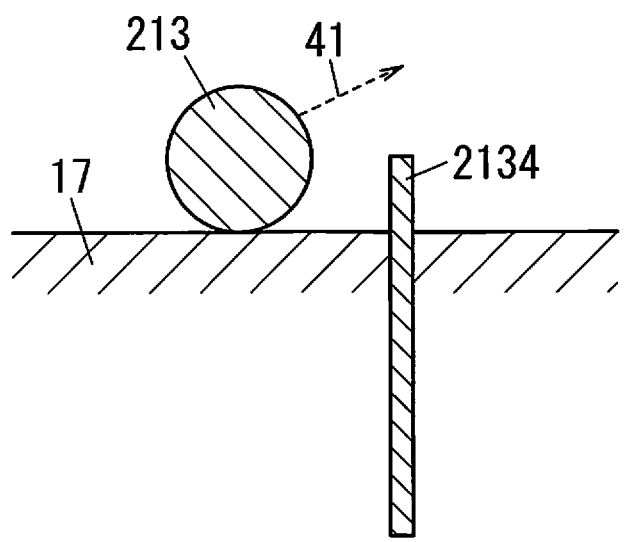
FIG. 8A is a cross-sectional view of a main portion of the agricultural house according to the embodiment.
Figure 8B:
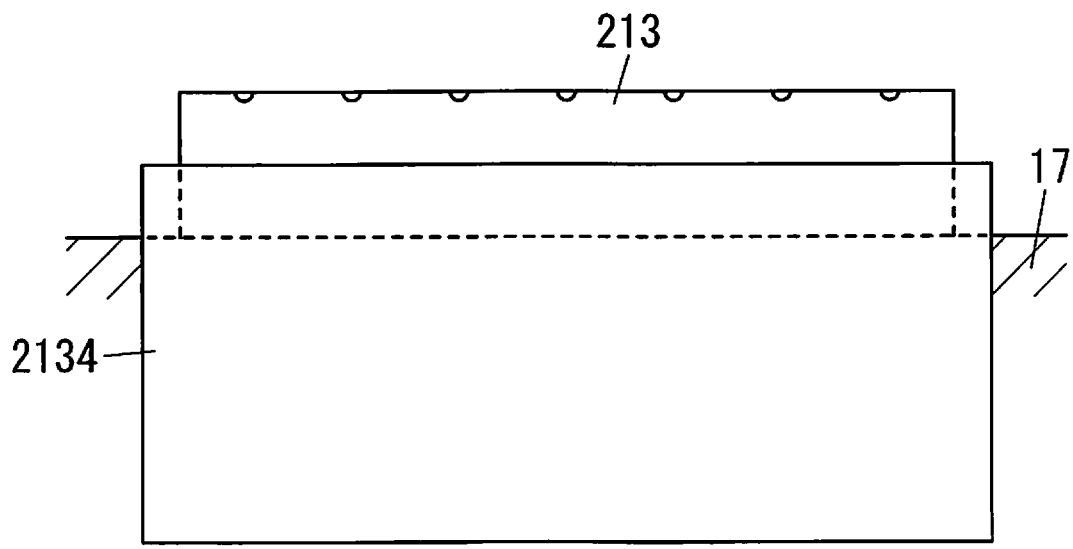
FIG. 8B is a side view of the main portion of the agricultural house according to the embodiment.

In order to prevent the water flowing around the watering tube 213 from affecting the plants 1, a water stop 2134 may be embedded in the ground 17 of the house body 10, as shown in FIGS. 8A and 8B, other than providing the water receiver 2131 described above. The water stop 2134 is made of a material through which water does not penetrate (such as synthetic resin), and is arranged between the watering tube 213 and the plants 1. The broken line arrow 41 in FIG. 8A shows the direction in which water is ejected from the watering tube 213, and indicates the plants 1 that the plants are located in that direction. The part of the water stop 2134 is embedded in the ground 17 to the depth of 15 to 30 cm from the surface of the ground. Note that an upper part of the water stop 2134 is exposed above the ground so as to inhibit the flow of water.

Such a water stop 2134 has a simpler structure than the water receiver 2131 and can be provided at a low cost. The water stop 2134 can be introduced easily even in a case where the watering tube 213 has been already installed.

On the other hand, the mist apparatus 212 includes a mist tube 214, as shown in FIG. 2. The mist tube 214 includes a plurality of nozzles that are mounted to the tube wall of the tube through which water is passed, and is configured such that water is sprayed from the nozzles when the water is passed through the tube. That is, in contrast to the watering tube 213 that ejects water continuously, the mist tube 214 ejects particulate water. Accordingly, in contrast to the water ejected from the watering tube 213 falling onto the worked soil portion 15 or the plants 1 immediately, the water ejected from the mist tube 214 takes a relatively long time to fall onto the worked soil portion 15 or the plants 1. Depending on the shape of the nozzle of the mist tube 214, it is possible to make the water particles remain in the air longer by reducing the size of the sprayed water particles.

The watering tube 213 and the mist tube 214 are fixed to predetermined positions of the house body 10. Accordingly, it is possible for water ejected from the watering tube 213 and the mist tube 214 to be sprinkled onto desired locations by adjusting a pressure of the water supplied to the watering tube 213 and the mist tube 214 to a predetermined pressure. That is, by ejecting water from the water supply apparatus 21, the plants 1 and the worked soil portion 15 are irrigated. Note that the configuration of the water supply apparatus 21 is not limited to the above-described configuration in which the watering tube 213 and the mist tube 214 are used, and a configuration including a movable discharge opening such as a sprinkler may be adopted as the watering apparatus 211.

The water supply apparatus 21 includes, as shown in FIG. 5, on-off valves 215 and 216 constituted by an electromagnetic valve on flow paths for respectively supplying water to the watering apparatus 211 and the mist apparatus 212 in order to separately control the timing at which the watering apparatus 211 and the mist apparatus 212 are caused to eject water. The opening/closing of the on-off valves 215 and 216 are controlled separately, and supply of water to the watering apparatus 211 is selected separately from supply of water to the mist apparatus 212. By controlling the opening/closing of the on-off valve 215, supply of water to the watering apparatus 211 is selected. By controlling the on-off valve 216, supply of water to the mist apparatus 212 is selected. The water that is supplied to the watering apparatus 211 and the mist apparatus 212 is pressurized to a predetermined pressure by a water pump 217.

Incidentally, the water that is supplied to the watering apparatus 211 and the mist apparatus 212 is supplied from a water storage tank 218. The water stored in the water storage tank 218 is selected from city water, well water, rainwater, or the like. The temperature of the water stored in the water storage tank 218 is adjusted by a chiller 219, and the temperature-adjusted water is supplied to the watering apparatus 211 and the mist apparatus 212 through a water pump 217. That is, the water pump 217, the water storage tank 218, and the chiller 219 constitute a water supply facility 26 that supplies water to the watering apparatus 211 and the mist apparatus 212. Here, although the chiller 219 is not essential, by providing the chiller 219, cold water or warm water can be supplied to the watering apparatus 211 and the mist apparatus 212. That is, the temperature of the water supplied to the plants 1 can be adjusted such that an environment appropriate for the growth of the plants 1 can be obtained.

Incidentally, a doorway of the house body 10 is provided in approximately the center of the gable wall portion 103 of the house body 10, and the water pump 217 is arranged to the side of the doorway so as not to block the doorway. Accordingly, when the two watering tubes 213 are arranged along the side wall portions 102 of the house body 10 as in the configuration described above, the distances from the water pump 217 to the respective watering tubes 213 differ from each other. Therefore, the time period taken for water to start being ejected from the watering tube 213 after the operation of the water pump 217 is started differs for each watering tube 213, and bias occurs in the water mount supplied to the plants 1.

A technique for reducing the time difference of the time period required for each of the two watering tubes 213 to start ejecting water will be described below. In the example shown in FIG. 9, water pressurized by the water pump 217 is supplied to the two watering tubes 213 through a pressure accumulator tank 271. An on-off valve 215 common to the two watering tubes 213 is provided on a path for supplying water to the two watering tubes 213 from the pressure accumulator tank 271.

Figure 9:
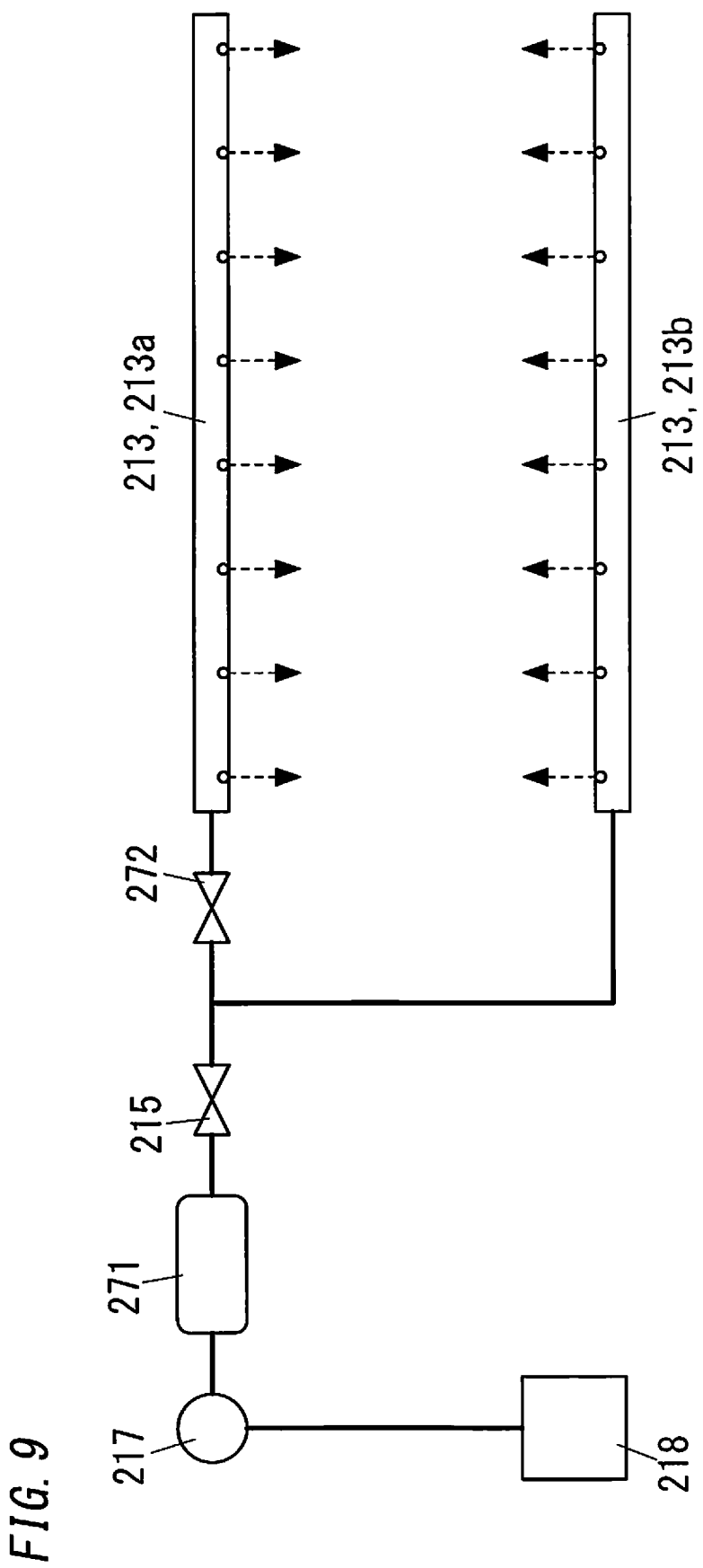
FIG. 9 is a schematic diagram illustrating an exemplary configuration of a water supply apparatus used in the agricultural house according to the embodiment.

In order to suppress bias in the water amount described above, in the exemplary configuration shown in FIG. 9, an on-off valve 272 is inserted between the water pump 217 and a first watering tube 213a that is closer to the water pump 217 out of the two watering tubes 213 in addition to the on-off valve 215. Only the on-off valve 215 is inserted between the water pump 217 and a second watering tube 213b that has a longer path length from the water pump 217 out of the two watering tubes 213.

Here, the on-off valves 215 and 272 are controlled by the control apparatus 30 (refer to FIG. 1), and the on-off valve 272 is opened after a predetermined time period from the time when the on-off valve 215 was opened. That is, the on-off valve 272 remains closed when the on-off valve 215 is opened, and the on-off valve 272 is opened at a point in time when a time period that is expected to be required for the water pressures of the two watering tubes 213 to become the same has passed. As a result, the water pressures of the two watering tube 213 become approximately the same. The timing when the on-off valve 272 is opened after the on-off valve 215 is opened may be determined based on an actual measurement.

Figure 10:
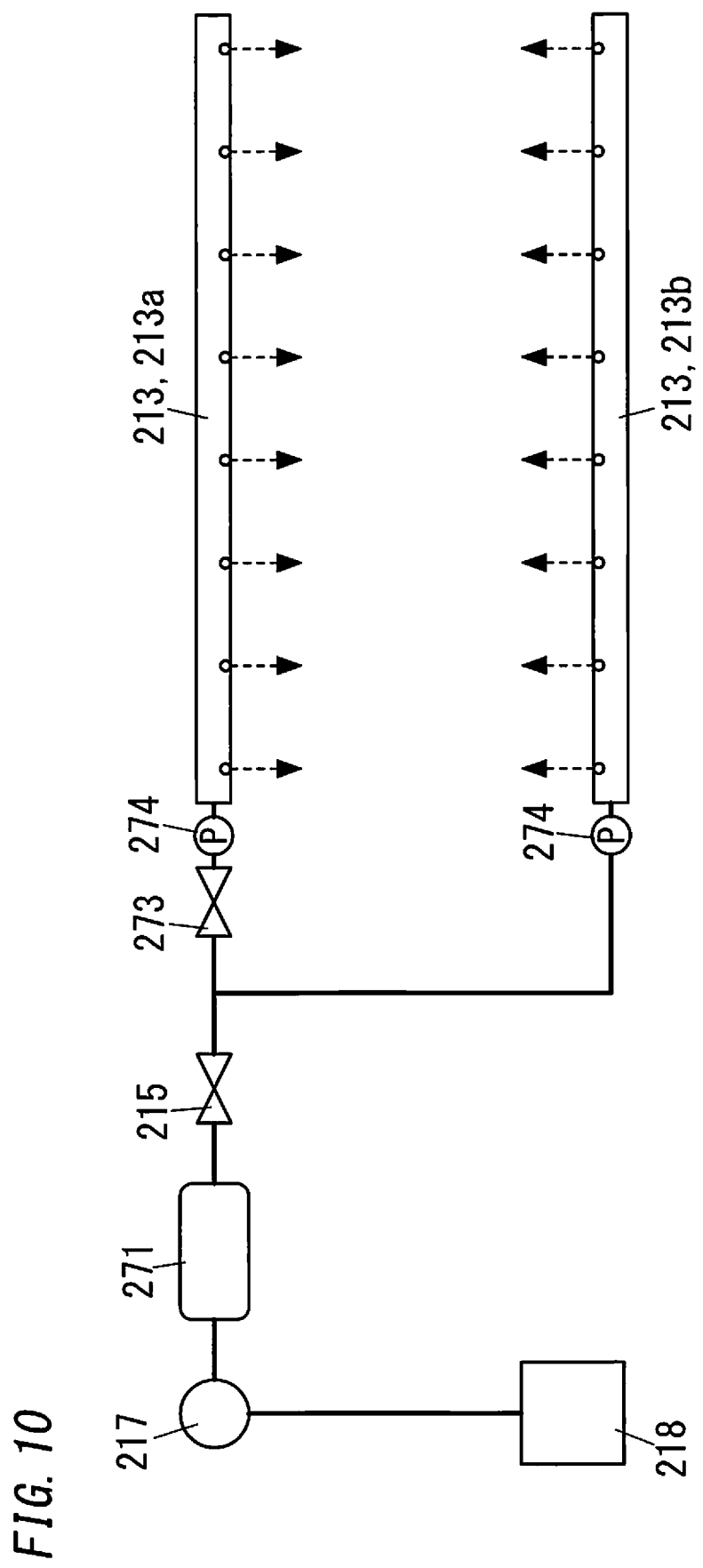
FIG. 10 is a schematic diagram illustrating another exemplary configuration of the water supply apparatus used in the agricultural house according to the embodiment.

A configuration may be adopted in which a motor-operated valve 273 having an adjustable opening amount is provided, as shown in FIG. 10, between the water pump 217 and the first watering tube 213a out of the two watering tubes 213, instead of the on-off valve 272 shown in FIG. 9, and the water pressures of the two watering tubes 213 are respectively measured by the pressure sensors 274. In this configuration, the control apparatus 30 performs feedback control of the opening amount of the motor-operated valve 273 after the motor-operated valve 273 is opened, such that the two water pressures measured by the two pressure sensors 274 become the same. Due to this configuration, the timings when the two watering tubes 213 start to eject water can be matched.

A ceiling curtain 221 is attached to the house body 10, as shown in FIG. 2. The ceiling curtain 221 is openable and closable between a closed state and an open state. In the closed state, intensity of outside light that enters through a roof portion 101 is reduced. In the open state, the outside light that enters through the roof portion 101 is incident on the plants 1 without the light intensity being reduced. Also, a side window 104 that is openable and closable is formed in a side wall portion 102 of the house body 10, and airflow resistance of air when outside air is taken into the house body 10 is adjusted by an opening amount of the side window 104 being adjusted by a translucent member. Furthermore, a side curtain 222 is arranged in the side wall portion 102 of the house body 10 in addition to the side window 104.

The side curtain 222 is configured to be openable and closable between a closed state in which intensity of outside light that enters through the side wall portion 102 of the house body 10 is reduced and an open state in which the outside light that enters through the side wall portion 102 is incident on the plants 1 without the light intensity being reduced (open state in which outside light is not blocked). The ceiling curtain 221, the side curtain 222, and the side window 104 are driven by a power source (not shown) such as a motor. An openable and closable end window 105 (refer to FIGS. 16A to 16D) is provided in the gable wall portion 103.

By the ceiling curtain 221 and the side curtain 222 being closed and opened, an amount of heat that is flowed into the house body 10 is adjusted. By opening and closing the ceiling curtain 221 and the side curtain 222, the speed at which temperature rises in the internal space of the house body 10 is adjusted. Also, by adjusting an opening amount of the side window 104, the speed at which outside air is taken into the house body 10 is adjusted. The ceiling curtain 221 and the side curtain 222 mainly contribute to the adjustment of an amount of heat that enters the internal space of the house body 10. Also, the side window 104 is used when the temperature is adjusted by making use of the temperature difference in temperatures outside and inside the house body 10, by taking outside air into the internal space of the house body 10. For example, an increase of the internal temperature of the house body 10 is suppressed by closing the ceiling curtain 221 and the side curtain 222, and by increasing the opening amount of the side window 104 on a sunny day during summer.

The house body 10 includes an airflow forming apparatus 23 that creates airflow in the vicinity of the plants 1. The airflow forming apparatus 23 includes ventilation apparatuses 231 that are respectively arranged in the vicinity of upper portions of the pair of gable wall portions 103. The ventilation apparatus 231 is arranged at a position that is higher than the plants 1 and is on a side opposite to the roof portion 101 with the ceiling curtain 221 interposed therebetween in the close state of the ceiling curtain 221. The ventilation apparatus 231 is operated when necessary, and outside air can be forcibly taken into the house body 10 by operating the ventilation apparatus 231 when the side window 104 is open. The ventilation apparatus 231 may be either of a ventilation fan for exhausting air from the house body 10 or an air blower for taking outside air into the house body 10.

Also, it is possible for an air blower to be arranged inside the house body 10, and the humidity in the vicinity of the plants 1 is adjusted by forcibly creating airflow in the vicinity of the plants 1 by the air blower. It is desirable that this type of air blower is movable inside the house body 10 not to interfere with planting or harvesting of the plants 1. For example, a configuration is adopted in which an arm to which the air blower is mounted is coupled to the side wall portion 102 of the house body 10 by a hinge. In this configuration, the air blower can be moved between a first position in which the air blower is close to the side wall portion 102 and a second position in which the air blower is above the worked soil portion 15 by pivoting the arm around the hinge.

Figures 11, 12A, 12B:
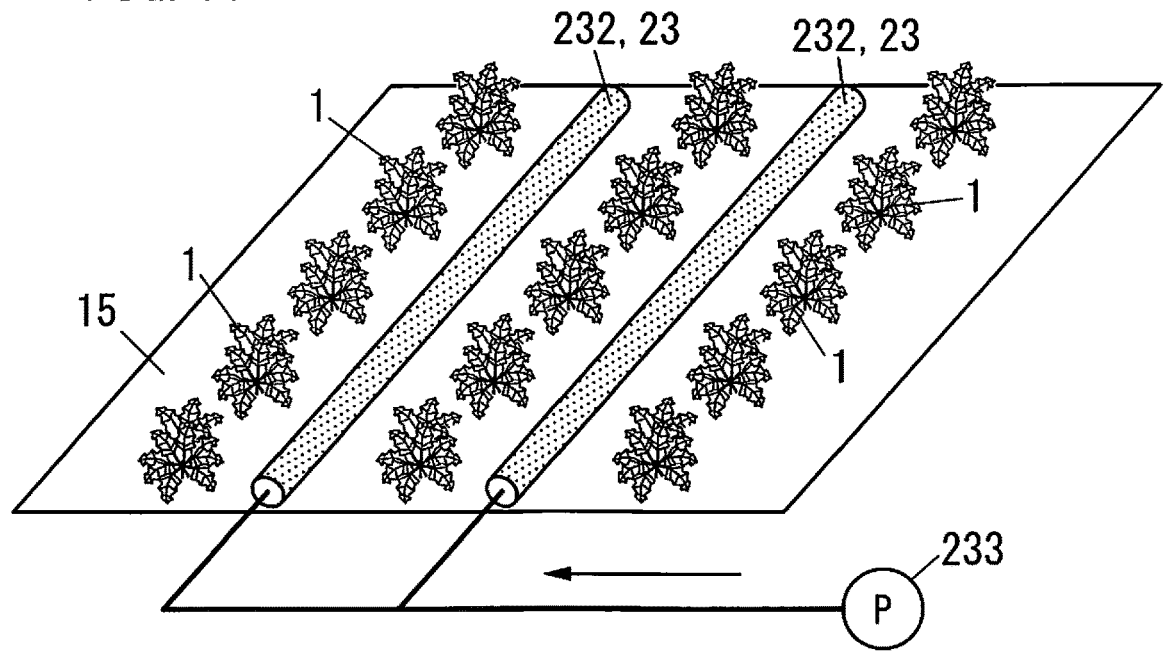
FIG. 11 is a perspective view illustrating an exemplary arrangement of an air blow tube used in the agricultural house according to the embodiment.
FIGS. 12A and 12B are diagrams illustrating exemplary data of a storage unit used in the agricultural house according to the embodiment.

The ventilation fan or the air blower includes an axial flow fan. Also, it is desirable that the ventilation apparatus 231 is a pressure fan, since the house body 10 has a large internal volume. Also, it is desirable that a ventilation speed by the ventilation apparatus 231 can be adjusted over a plurality of levels. The house body 10 according to the present embodiment further includes an air blow tube 232, serving as the airflow forming apparatus 23, that is arranged in the vicinity of the plants 1 over substantially the whole length of the house body 10 in the longitudinal direction, as shown in FIG. 11. The air blow tube 232 has a plurality of minuscule ventilation holes (not shown) in the tube wall, and an end portion is connected to an air blow pump 233. When air is sent to the air blow tube 232 from the air blow pump 233, the humidity in the vicinity of the plants 1 is reduced by the air being blown out from the ventilation hole. Note that the air blow tube 232 is arranged such that as little of the air blown out from the ventilation hole as possible is blown directly onto the plants 1.

In addition, a plurality of environment sensors 24 (refer to FIG. 13) that are configured to detect environment information including an ambient temperature of the plants 1 are arranged in the house body 10. Each environment sensor 24 is configured to measure, as the ambient temperature of the plants 1, a room temperature in the house body 10 in the vicinity of the plants 1 and the ground temperature of the worked soil portion 15. Also, it is desirable that the environment sensor 24 includes a humidity sensor that is configured to measure the humidity in the vicinity of the plants 1, and a light intensity sensor that is configured to measure the light intensity in the vicinity of the plants 1. An amount of heat that enters the house body 10 can be estimated by measuring a light intensity of the outside light with the light intensity sensor. Alternatively, the output of the light intensity sensor can be used to distinguish between a rainy day or nighttime and a sunny day.

As described above, the environment in which the plants 1 is grown in the house body 10 changes by controlling the side window 104, the ceiling curtain 221, the side curtain 222, the ventilation apparatus 231, the air blow pump 233, and the like, in addition to the water supply apparatus 21. Accordingly, in the present embodiment, the water supply apparatus 21, the airflow forming apparatus 23, the side window 104, the ceiling curtain 221, and the side curtain 222 constitute an environment forming apparatus that forms the environment in the vicinity of the plants 1. Control of the operations of such an environment forming apparatus is performed by the control apparatus 30 (refer to FIG. 1).

The control apparatus 30 is configured to control opening/closing of the on-off valves 215 and 216, water pressure adjustment of the water pump 217, adjustment of the water temperature of the chiller 219, opening/closing of the ceiling curtain 221 and the side curtain 222, adjustment of the opening amount of the side window 104, operation and shutoff of the ventilation apparatus 231, airflow to the air blow tube 232, and the like. Electromagnetic contactors (electromagnetic relays) that switch on/off power supply to the respective apparatuses are used for turning on/off electricity to the apparatuses. The control apparatus 30 is housed in a casing mounted to the house body 10, and constitutes a control board. Also, the control apparatus 30 acquires the environment information from the environment sensor 24 in a predetermined cycle, and performs the above control using the acquired environment information. Specific operations of the control apparatus 30 will be described later. The control apparatus 30 includes a device such as a microcomputer that operates according to a program as a main hardware element.

For example, the control apparatus 30 receives an output of the environment sensor 24 and gives an instruction to each apparatus via an interface unit included in a personal computer or an interface unit added to a personal computer. That is, by executing the program by the personal computer, the personal computer can be caused to function as the control apparatus 30. The control apparatus 30 may be configured as a dedicated apparatus rather than a general purpose computer.

Figure 1:
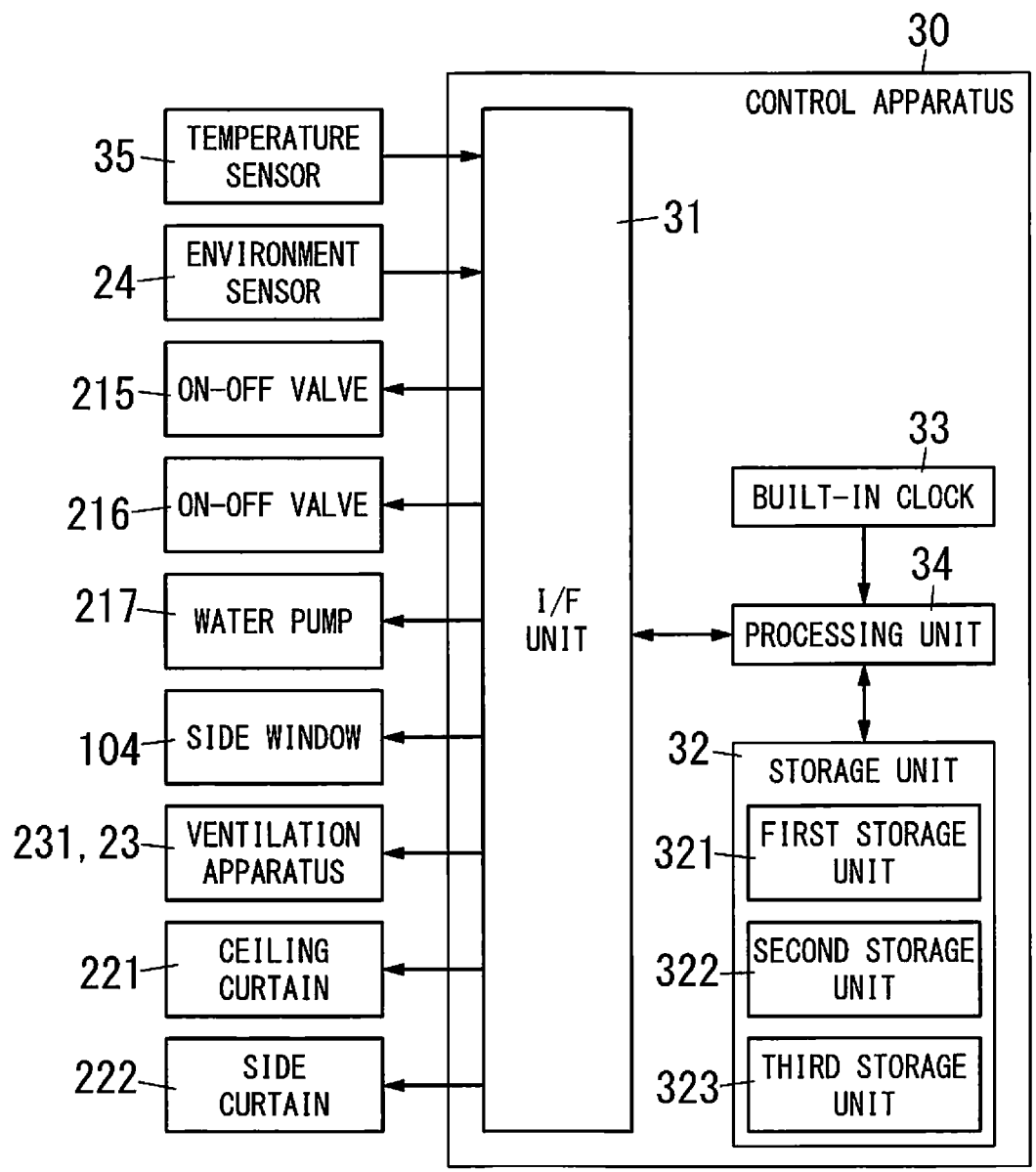
FIG. 1 is a block diagram of an apparatus used in an agricultural house according to an embodiment.

The control apparatus 30 includes, as shown in FIG. 1, an interface unit (hereinafter referred to as "I/F unit") 31 to which each apparatus described above and the environment sensor 24 are connected, a storage unit 32 that is configured to store various data described later, and a built-in clock 33 such as a real-time clock that clocks date and time. The control apparatus 30 further includes a processing unit 34 that is configured to control each apparatus described above using the environment information acquired from the environment sensor 24 via the I/F unit 31 and the various data stored in the storage unit 32. The I/F unit 31 includes the electromagnetic contactors that is configured to respectively switch on/off power supply to the apparatuses. The time interval for the I/F unit 31 to acquire the environment information from the environment sensor 24 is set from one to fifteen minutes, for example. An apparatus (not shown) for use as a user interface is connected to the I/F unit 31, and a user can perform setting of contents to be stored in the storage unit 32, time adjustment of the built-in clock 33, or the like, through this apparatus.

Incidentally, the house body 10 includes a temperature sensor 35 that is configured to measure the air temperature outside the house body 10, and the control apparatus 30 is configured to acquire the temperature measured by the temperature sensor 35 as one piece of the environment information via the I/F unit 31, and utilize the acquired information as necessary. Furthermore, the control apparatus 30 has a function of distinguishing the season and the time of day from the date and time measured by the built-in clock 33.

The control apparatus 30 is configured to change the operation content using the lowest outside air temperature of the house body 10 measured until sunrise of the current day by the temperature sensor 35. That is, since the lowest outside air temperature is an indicator for determining the season, the control apparatus 30 is configured to determine the season by the lowest outside air temperature until sunrise of the current day. For example, if the lowest temperature of the outside air temperature until the sunrise of the current day is 18° C. or more, the control apparatus 30 may determine that it is summer, and if the lowest temperature is 10° C. or below, the control apparatus 30 may determine that it is winter.

Note that if the lowest air temperature until sunrise of the current day is from 10° C. to 18° C., the control apparatus 30 uses a normal (standard) operation content that is neither for summer nor winter. It is desirable that the season is determined in combination with the date and time measured by the built-in clock 33. The control content includes the idle period length, the water amount for watering, the opening/closing of the side window 104, the opening/closing of the ceiling curtain 221 and the side curtain 222, and the operations of the ventilation apparatus 231 and the air blow pump 233.

The reason why the control apparatus 30 changes the control content of the environment forming apparatus according to the season is that the environment in the vicinity of the plants 1 changes according to the season. Since the environment in the vicinity of the plants 1 changes according to the time period of day, the control apparatus 30 is desirably also configured to change the control content according to the time period of day. Hereinafter, an example in which the control apparatus 30 change the control content according to the time of day will be described, after describing an example in which the control content is changed according to the season.

First, an operation in a case where a temperature increase in the internal space of the house body 10 is suppressed in the summer will be described as an example. In the summer, since the ambient temperature of the plants 1 increases, problems such as spindly growth of the plants 1, yellowing leaves, burnt leaf tips, wrinkled leaves, and disease damage are likely to occur. Specifically, the delicate vegetables are likely to have these types of problems, and furthermore, variance in quality is likely to occur due to the leaf damage. Therefore, it is necessary to suppress an increase of temperature in the internal space of the house body 10, and to reduce the temperature of leaves.

Here, a long-day plant such as spinach is likely to form flower buds when the daylight hours increases around the summer solstice, and the commodity value could be lost due to the plants overgrowing. When the interval between the seeds was adjusted at the time of sowing, it was found that a relationship exists between the interval of the seeds and a probability of the plants overgrowing.

An example of this relationship will now be shown. Each of the plants 1 was spinach, and seeds were planted to form a plurality of linear columns. In this case, the probability of occurrence of the plants overgrowing was greatly reduced by sowing the seeds as shown in TABLE 1.

TABLE 1

| ROW INTERVAL | SEED INTERVAL IN ROW |
| --- | --- |
| 7 cm or more | 9 cm or more (10 cm or more) |
| 10 cm or more | 7 cm or more (10 cm or more) |
| 15 cm or more | 5 cm or more (6 cm or more) |

The numbers in parentheses in the column "seed interval in row" in TABLE 1 show more desirable values. According to TABLE 1, the result of reducing the occurrence of the plants overgrowing was obtained by setting the density of the seeds to 70 cm$^2$ or more, or desirably to 90 cm$^2$ or more.

In the present embodiment, as a technique for lowering leaf temperature, light intensity reduction by the ceiling curtain 221 and the side curtain 222, ventilation or dehumidification by the side window 104, the ventilation apparatus 231, and the air blow tube 232, and watering by the watering apparatus 211 and the mist apparatus 212 are used in combination.

The ceiling curtain 221 and the side curtain 222 not only suppress an increase in the internal temperature of the house body 10 by reducing light intensity, but also suppress the intensity of strong light in the summer, and as a result an effect of causing the plants 1 to perform photosynthesis effectively can be expected.

The ventilation apparatus 231 and the side window 104 perform ventilation by discharging the air inside the house body 10 and taking outside air into the inside of the house body 10, and suppress an increase in the internal temperature of the house body 10. Also, the air blow tube 232 creates airflow in the vicinity of the plants 1 to facilitate the transpiration action of the plants 1 and furthermore to reduce humidity in the vicinity of the plants 1.

Incidentally, the watering apparatus 211 and the mist apparatus 212 are used to lower the leaf temperature by applying water whose temperature is lower than the ambient temperature of the plants 1, and also to lower the ambient temperature of the plants 1 due to vaporization heat. The watering apparatus 211 contributes to lowering the leaf temperature of the plants 1 and the ambient temperature of the plants 1 mainly in the lower portion of the house body 10, and the mist apparatus 212 contributes to lowering the air temperature mainly in the upper portion of the house body 10.

When watering is performed for the purpose of lowering the leaf temperature, it is desirable that the water temperature is set to approximately 10° C. by the chiller 219 in the summer. Since it takes a relatively long period of time for the chiller 219 to achieve the water temperature to the set temperature, when using the chiller 219, the temperature adjustment needs to be started, at a point in time going back from the time when the water supply apparatus 21 is to supply water to the plants 1, in consideration of the time period taken for the water temperature to reach the set temperature. Note that in a case where the temperature of the plants 1 is low, such as during winter, the leaf temperature may be increased by setting the water temperature to approximately 15° C. with the chiller 219.

In the present embodiment, as a technique of controlling the environment of the plants 1 described above, light intensity reduction by the ceiling curtain 221 and the side curtain 222, ventilation or dehumidification by the side window 104, the ventilation apparatus 231, and the air blow tube 232, and watering by the watering apparatus 211 and the mist apparatus 212 are used in combination. Note that, hereinafter, operations for controlling the ambient temperature of the plants 1 by using the watering apparatus 211 and the mist apparatus 212 will be mainly described.

The watering apparatus 211 and the mist apparatus 212 are mainly used for the purpose of supplying water to the plants 1 and controlling the ambient temperature of the plants 1. Therefore, the control apparatus 30 is configured to control at least one of the timing and the amount of watering performed by the watering apparatus 211 and the mist apparatus 212, according to the ambient temperature of the plants 1 measured by the environment sensor 24. The timing and the amount of watering with respect to the ambient temperature of the plants 1 measured by the environment sensor 24 are predetermined and stored in the storage unit 32.

The storage unit 32 includes a first storage unit 321 in which the ambient temperature and the water amount are associated according to the growth stage of the plants 1, as shown in FIG. 12A, and a second storage unit 322 in which the ambient temperature and the timing of watering are associated according to the growth stage of the plants 1, as shown in FIG. 12B. The growth stage of the plants 1 is divided into three periods, namely a period before sprouting, a period less than 10 days after sprouting, and a period 10 days or more after sprouting, in the illustrated example. Also, the ambient temperature of the plants 1 is divided into four segments of temperature, namely temperature of less than 10° C., temperature of 10° C. or more and less than 20° C., temperature of 20° C. or more and less than 30° C., and temperature of 30° C. or more. Note that these divisions can be set as appropriate. Also, the amount and the timing of watering with respect to the growth stage and the ambient temperature are set taking into consideration an amount of evaporation at the time of watering according to the ambient temperature and a watering amount limit that depends on the growth stage of the plants 1.

In the illustrated example, the water amount is increased as growth proceeds in the growth stage of the plants 1, and the water amount is also increased as the ambient temperature of the plants 1 increases. Also, the time interval of water ejection is decreased as growth proceeds in the growth stage of the plants 1. The water amount that is ejected from the watering apparatus 211 is large compared with that of the mist apparatus 212, and accordingly the water amount that is directly applied on the plants 1 is large. Therefore, the time interval of ejecting water is set longer in the watering apparatus 211 than in the mist apparatus 212 (double in the illustrated example). Note that it is desirable that the time period of ejecting water from the watering apparatus 211 and the mist apparatus 212 is set to approximately one to several minutes for each watering depending on the water amount ejected from the watering apparatus 211 and the mist apparatus 212 in a unit period of time.

Now, a condition is assumed in which the ambient temperature of the plants 1 measured by the environment sensor 24 is 30° C. or more, and the growth stage of the plants 1 is in the time period of less than 10 days after sprouting. Under this condition, a water amount of 50 L is ejected from the water supply apparatus 21 according to FIG. 12A, and water is ejected from the watering apparatus 211 every one hour and from the mist apparatus 212 every 30 minutes according to FIG. 12B.

The working pressure and the water amount (watering amount) that is ejected in an unit period of time of the watering apparatus 211 and the mist apparatus 212 is determined by the specifications of each product, and the period of time for each watering is adjusted so as to obtain the required water amount. Note that the water amount shown in FIG. 12A is a total of the water amounts when both the watering apparatus 211 and the mist apparatus 212 are used, and the amount of water that is ejected only from the mist apparatus 212 is determined by the distribution ratio of the water amounts ejected from the watering apparatus 211 and the mist apparatus 212.

As described above, by performing watering from the water supply apparatus 21, the air temperature of the house body 10 can be lowered due to utilizing vaporization heat, and the ambient temperature of the plants 1 can be lowered by bringing cold water into contact with the plants 1. However, a state in which the plants 1 are wet for a long period of time, a state in which too much water is in the vicinity of the roots of the plants 1, a state in which the ambient humidity of the plants 1 is too high, or the like may cause disease damage to the plants 1. Therefore, a state in which the plants 1 becomes excessively wet is avoided by adjusting the timing of watering by the water supply apparatus 21, as shown in FIG. 12B, and performing watering intermittently.

That is to say, a watering period during which watering is performed from the water supply apparatus 21 and an idle period during which watering from the water supply apparatus 21 is prohibited after the watering period are provided such that watering is not performed until the watering timing set in the second storage unit 322 after performing watering once. Since watering is prohibited in the idle period, the ambient temperature of the plants 1 and the water content of the worked soil portion 15 at the point of time when the watering is performed varies. In view of this, the water amount needs to be associated with the ambient temperature in addition to the amount of watering, as shown in FIG. 12A. In short, since the idle period is prioritized in the control of the water supply apparatus 21 more than the environment information detected by the environment sensor 24, the ambient temperature of the plants 1 when the watering is started is not fixed, and it is anticipated that the water content of the worked soil portion 15 differs if the ambient temperature of the plants 1 differs. Therefore, the amount of watering is determined based on the ambient temperature of the plants 1. Note that the watering timing stored in the second storage unit 322 can be arbitrarily set by the user using an apparatus serving as a user interface.

Incidentally, the environment sensor 24 measures the temperature in the vicinity of the plants 1, and at least one of the water amount and the timing when watering is performed is adjusted according to the growth stage of the plants 1, and thus the position is important at which the environment sensor 24 measures the ambient temperature of the plants 1. In view of this, it is considered to serve the purpose more if the measuring point of the ambient temperature is changed according to the growth of the plants 1, when the ambient temperature is measured taking the growth stage of the plants 1 into consideration. In particular, since the air temperature inside the house body 10 is considered to be higher in the upper portion than in the lower portion, when the height dimension of the plants 1 increases associated with the growth of the plants 1, the temperature in the vicinity of an upper end of the plants 1 is considered to be the highest. Accordingly, when watering is performed for the purpose of suppressing temperature increase of the plants 1 in the summer as well, the temperature used for determining the water amount and the timing when watering is performed is desirably a temperature in the vicinity of an upper end of the plants 1.

Note that the temperature in the vicinity of the plants 1 is desirably a temperature in the vicinity of an upper end of the plants 1, but is not limited to the temperature in the vicinity of the upper end of the plants 1. A temperature measured at any portion may be used as long as the temperature has a substantially constant relationship with the temperature in the vicinity of the upper end of the plants 1. The temperature in the vicinity of the upper end of the plants 1 will be related to the temperature of a portion if the portion is positioned at a height less than half of the ceiling height of the house body 10, as a guide.

Figures 13, 14:
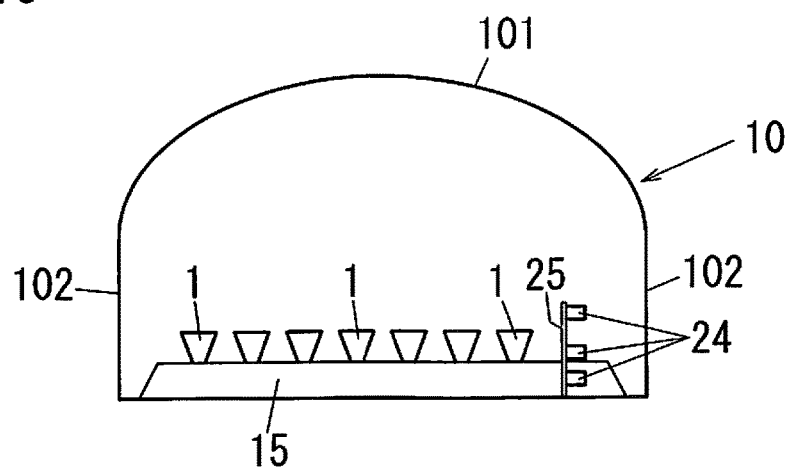
FIG. 13 is a cross-sectional view illustrating an exemplary arrangement of environment sensors used in the agricultural house according to the embodiment.
FIG. 14 is a diagram illustrating exemplary data of the storage unit used in the agricultural house according to the embodiment.

In a case of detecting the temperature in the vicinity of the upper end of the plants 1, the position at which the environment sensor 24 measures the temperature may be changed according to the growth of the plants 1. For example, as shown in FIG. 13, the environment sensors 24 are arranged at a plurality of heights, and an output of an environment sensor 24 having a height closest to the height of the upper end of the plants 1 is selected to be used by the control apparatus 30 according to the growth of the plants 1. It is desirable that not only an air temperature but also a soil temperature of the worked soil portion 15 is measured as the ambient temperature of the plants 1. Accordingly, a plurality of positions may be set for the height positions of the environment sensors 24, with the height of the plants 1 at a harvest time determined empirically relative to an upper surface of the worked soil portion 15 being the upper limit and the worked soil depth of the worked soil portion 15 being the lower limit. The environment sensors 24 above the ground and the environment sensors 24 below the ground are arranged respectively in ranges of 30 cm from the surface of the worked soil portion 15, for example.

In an example shown in FIG. 13, three environment sensors 24 are arranged at different height positions. The three environment sensors 24 are attached to an installation bar 25 whose lower portion is embedded in the worked soil portion 15, and the installation bar 25 is set up in the vicinity of the plants 1, and as a result the three environment sensors 24 measure temperatures at three different height positions, respectively. The environment sensor 24 at the lowest position measures a soil temperature, the environment sensor 24 at the middle position measures an air temperature in the vicinity of the surface of the worked soil portion 15, and the environment sensor 24 at the highest position measures an air temperature in the vicinity of an upper end of the plants 1 at a harvest time. Note that the arrangement example shown in FIG. 13 is an example, and the arrangement is not limited thereto. Four environment sensors 24 or more may be used.

Incidentally, the growth of the plants 1 can be monitored by using a TV camera or the like so as to measure the height position of an upper end of the plants 1. However, costs may increase if this technique is adopted.

In the present embodiment, it is assumed that the number of elapsed days since the plants 1 sprouted is correlated with the height position of an upper end of the plants 1. Accordingly, the storage unit 32 in the control apparatus 30 includes a third storage unit 323 in which the number of days since the plants 1 sprouted is associated with the environment sensors 24 having different height positions.

In an example shown in FIG. 14, a soil temperature obtained from the environment sensor 24 at the lowest position, an air temperature obtained from the environment sensor 24 at the middle position, and an air temperature obtained from the environment sensor 24 at the highest position are used in the stated order according to the number of elapsed days after sprouting. That is, the processing unit 34 is configured to collate the elapsed time clocked by the built-in clock 33 with the number of elapsed days registered in the third storage unit 323, with the starting point of clocking being the time of sprouting inputted by the user using an apparatus serving as a user interface. The processing unit 34 is configured to select and use one of the ambient temperatures of the plants 1 measured by the three environment sensors 24 according to the number of elapsed days registered in the third storage unit 323.

Although, in the example shown in FIGS. 12A, 12B, and 14, the growth stage is expressed by the number of days from sprouting, the number of elapsed days from sowing can be used. Also, in a case where an image of the plants 1 is monitored by a TV camera or the growth stage of the plants 1 is confirmed visually, the growth stage can be determined by monitoring the existence/non-existence of main leaves on the plants 1, the number of main leaves, or the like. In this case, a next stage transition switch (not shown) is added for the user to operate in order to select one of the environment sensors 24 according to the growth stage. That is, the target environment sensor 24 is selected by the user confirming the growth of the plants 1 through an image or visually and operating the next stage transition switch. Furthermore, since the number of days in the growth stages and the water amount when watering is performed may be different depending on the season, it is desirable that the first to third storage units 321 to 323 are provided for each season.

In the example shown in FIG. 14, when the three environment sensors 24 having different height positions are used, in the period from sowing to sprouting, the soil temperature measured by the environment sensor 24 at the lowest position is used, since the watering needs to be performed based on the temperature in the vicinity of the seeds. Also, in the period from sprouting to less than 10 days after sprouting in which the plant height is low, the air temperature measured by the environment sensor 24 at the middle position is used in order to use the temperature of the surface of the worked soil portion 15 as the ambient temperature of the plants 1. Furthermore, in the period from 10 days after sprouting, the air temperature measured by the environment sensor 24 at the highest position is used in order to use the temperature in the vicinity of a leaf surface of the plants 1 as the ambient temperature of the plants 1. In short, in the example shown in FIG. 14, similarly to the example shown in FIG. 12A, the water amount when watering is performed is associated with the growth stage of the plants 1 and the ambient temperature of the plants 1. The example shown in FIG. 14 differs from the example shown in FIG. 12A in that different environment sensors 24 are used, according to the growth stage, to detect the ambient temperature of the plants 1.

Although the aforementioned example has been described in the case where the environment sensor 24 measures the ambient temperature of the plants 1, an environment sensor 24 that measures humidity and light intensity in addition to the ambient temperature of the plants 1 may be used. When the temperature and the humidity in the vicinity of the plants 1 is higher than the temperature and humidity appropriate for the growth environment, abnormality in the growth of the plants 1 is likely to occur, or disease damage is likely to occur. Also, the light intensity in the vicinity of the plants 1 is generally correlated with the amount of heat that enters the house body 10, and when the light intensity is high, it is possible that the ambient temperature increases. In view of this, if the humidity and the light intensity are used in addition to the ambient temperature in the control apparatus 30, finer control of the growth environment of the plants 1 may be performed.

With respect to humidity, occurrence of disease damage to the plants 1 caused by an increase in humidity is suppressed by not performing watering if the humidity is higher than a reference value, even in a case where watering is required due to a temperature increase. Also, with respect to light intensity, since it is generally known that the ambient temperature of the plants 1 increases as the light intensity increases, it is desirable to measure an accumulated light intensity in a predetermined time period and to perform watering when the accumulated light intensity is a reference value or more.

Since the house body 10 includes, as shown in FIG. 2, the side window 104, the ventilation apparatus 231, and the air blow tube 232 (refer to FIG. 11), it is desirable that ventilation and dehumidification are performed by the control apparatus 30 controlling these apparatuses appropriately, when the humidity is higher than a reference value. For example, when the humidity in the vicinity of the plants 1 is increased by watering, dehumidification inside the house body 10 is possible by opening the side window 104 and operating the ventilation apparatus 231. Also, it is possible to decrease the humidity in the vicinity of the plants 1 by airflow created in the vicinity of a cluster of the plants 1 when air is ejected from the air blow tube 232. That is, the ventilation apparatus 231 and the air blow tube 232 are operated in accordance with the watering timing. Furthermore, it is desirable that the control apparatus 30 controls the operations of the ventilation apparatus 231 and the air blow tube 232 according to the amount of watering or the humidity detected by the environment sensor 24 after watering.

As described above, the control apparatus 30 can perform dehumidification of the house body 10 immediately after watering by operating the ventilation apparatus 231 and the air blow tube 232 immediately after the watering performed by the water supply apparatus 21. Also, heat is taken away due to vaporization by creating airflow immediately after watering, thus contributing to cooling the internal space of the house body 10. That is, it is possible to maintain the environment of the plants 1 at an appropriate temperature and humidity, and to maintain the growth environment of the plants 1 appropriately by reducing the ambient temperature of the plants 1 by watering, and by performing dehumidification and cooling immediately thereafter. Note that the air blow tube 232 can be omitted.

If the ceiling curtain 221 and the side curtain 222 are opened on a sunny day, the temperature in the house body 10 increases. Since the soil temperature of the worked soil portion 15 increases immediately after the ceiling curtain 221 and the side curtain 222 are opened, the ambient humidity of the plants 1 is decreased by opening the ceiling curtain 221 immediately after watering. If it is a sunny day, the control apparatus 30 can suppress a temperature increase in the house body 10 by closing the ceiling curtain 221 and the side curtain 222, and can perform dehumidification by increasing the soil temperature through temporarily opening the ceiling curtain 221 immediately after watering. In this case, when the humidity decreases, an increase of the air temperature is suppressed by closing the ceiling curtain 221. An opening period of the ceiling curtain 221 is determined according to the water amount when watering is performed, and is adjusted according to the air temperature measured by the environment sensor 24. Here, although the opening/closing of the ceiling curtain 221 and the side curtain 222 are controlled based on the water amount and the air temperature when watering is performed, control may be performed based on the other conditions. For example, it is possible to set a condition for controlling opening/closing of the ceiling curtain 221 and the side curtain 222 according to the growth stage of the plants 1.

In the exemplary configuration described above, since the control apparatus 30 controls the operation of the water supply apparatus 21 using only the output of the environment sensor 24, only the control according to the environment of the plants 1 at a point of time when the environment sensor 24 performs measurement is performed. However, depending on the environment change occurring after the point in time of measurement by the environment sensor 24, such as a case where it starts raining after several hours from the point in time of measurement so that the humidity increases, there is possibility that control based on the output of the environment sensor 24 is an impediment to the plants 1.

In order to handle such a case, it is desirable that a communication interface unit that is configured to acquire weather forecast information from outside is provided to the I/F unit 31 of the control apparatus 30. In this case, the control apparatus 30 has a function of predicting the ambient temperature of the plants 1 from the weather forecast information acquired via the I/F unit 31 and determining a plan of at least one of a timing and an amount of watering performed by the water supply apparatus 21 based on the prediction result. For example, in a case where it is anticipated from the weather forecast information that it will start raining six hours later, since the humidity is anticipated to increase, the control apparatus 30 may perform control so as to not perform watering, even in a case where the ambient temperature of the plants 1 measured by the environment sensor 24 satisfies the condition for watering. Also, in a case where the internal temperature of the house body 10 can be predicted from the weather forecast information, the control apparatus 30 may control the chiller 219 such that the water temperature of the chiller 219 reaches the target temperature before the next watering time.

As described above, the control apparatus 30 according to the present embodiment has a configuration in which the watering timing is set such that watering by the water supply apparatus 21 is performed at times set in the second storage unit 322, and watering with a water amount determined according to the temperature measured by the environment sensor 24 at the time of watering is performed. Note that the control apparatus 30 does not perform watering if the humidity before watering is a reference value or more, and also performs dehumidification using the ceiling curtain 221 and the ventilation apparatus 231 after the watering. Note that, if the humidity before watering is the reference value or more, the control apparatus 30 can perform dehumidification and ventilation using the ventilation apparatus 231, and decrease the air temperature by watering after the dehumidification.

Hereinafter, the operations in the winter that are different from the summer will be described. In the winter, at least one of a timing and an amount of watering that the control apparatus 30 causes the water supply apparatus 21 to perform is set such that the ambient temperature of the plants 1 is higher than that in the summer. By maintaining the temperature in the winter higher than that in the summer, it is possible to keep the ambient temperature of the plants 1 at a relatively high temperature even though the hours of sunlight decreases in the winter, and a significant increase in the number of days of the cultivation period can be suppressed. In particular, in the winter, the temperature is adjusted such that the ambient temperature of the plants 1 is higher than the temperature appropriate for growth. Also, since the relative humidity decreases when the ambient temperature of the plants 1 decreases, there is possibility that a problem will occur in the transpiration action from leaves that is necessary for photosynthesis, and there is possibility that physiological disorder will occur such as leaf differentiation not proceeding normally. In contrast, in the present embodiment, since the ambient temperature of the plants 1 is maintained at a relatively high temperature in the winter, occurrence of physiological disorder due to low temperature can be suppressed.

From the above, a control content is set in the control apparatus 30 such that the ambient temperature of the plants 1 in the winter will be a temperature higher than that in the summer for the purpose of heat retention. Also, since the ambient temperature of the plants 1 in the daytime is higher than that in the nighttime, relative humidity in the daytime decreases relative to that in the nighttime. Therefore, the control apparatus 30 causes the mist apparatus 212 to operate for the purpose of humidification. Similarly, by dividing the daytime into two time slots of morning and afternoon, the mist apparatus 212 may be caused to operate in the afternoon time slot when the relative humidity decreases.

Meanwhile, similarly to the exemplary operation described above, it is effective to perform dehumidification by creating airflow using the airflow forming apparatus 23 (ventilation apparatus 231 and air blow tube 232) as necessary for preventing an excessive increase of humidity. Furthermore, it is desirable to use the airflow forming apparatus 23 for preventing air stagnation in the internal space of the house body 10 and taking fresh air into the vicinity of the plants 1. Note that, in the winter, since there is possibility that the temperature in the house body 10 decreases when the airflow forming apparatus 23 is operated, the control apparatus 30 causes the airflow forming apparatus 23 to operate regularly in a range in which the temperature of the cluster of the plants 1 is maintained at a predetermined temperature or more in the winter.

Figure 15:
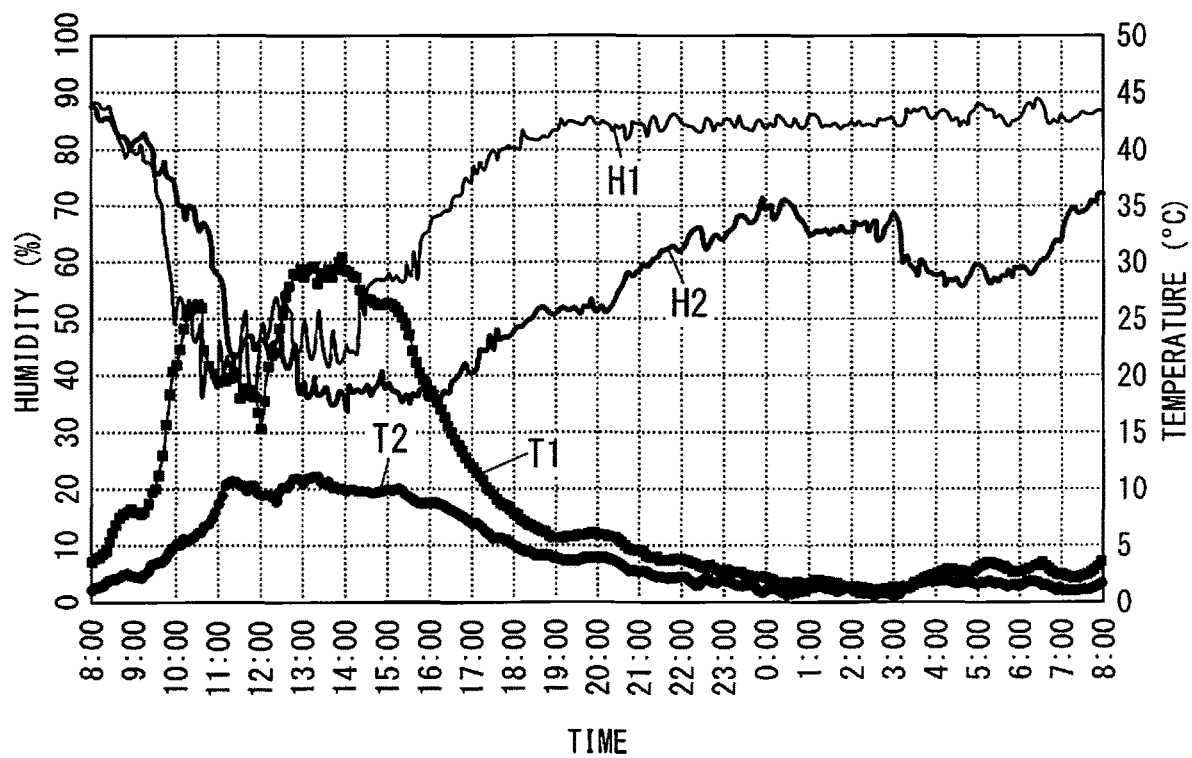
FIG. 15 is a diagram illustrating an exemplary operation of the agricultural house according to the embodiment.

An exemplary actual measurement of the temperature of a cluster of the plants 1 and the outside air temperature in winter is shown in FIG. 15. The house body 10 was installed such that the longitudinal direction thereof was in the north-south direction. Measurement conditions were as follows. That is, the side window 104 was opened only from 10:30 to 12:00, and was closed at the other times. The ceiling curtain 221 was opened from 8:30 to 16:00, and was closed at the other times. As for the side curtains 222, an east side thereof was opened and a west side was closed from 8:30 to 10:30, and the east side was closed and the west side was opened from 14:00 to 17:00. Furthermore, the east side and the west side of the side curtains 222 were both opened from 10:30 to 14:00, and were both closed at the other times. The ventilation apparatus 231 was operated when the cluster temperature reached 27° C. or more, and the air blow pump 233 was operated when the cluster temperature reached 25° C. or more. Furthermore, in the illustrated example, the ventilation apparatus 231 and the air blow pump 233 were operated for promoting ventilation in the time slot (10:30 to 12:00) when the side window 104 was opened. The mist apparatus 212 sprayed water when the humidity of the cluster of plants dropped to 50% or less.

The result shown in FIG. 15 was obtained under the above conditions. In the diagram, T1 designates the cluster temperature, T2 designates the outside air temperature, H1 designates the humidity of the cluster of plants, and H2 designates the outside air humidity. According to the measurement result, in the morning, by starting ventilation at 10:00 when the cluster temperature reached 25° C. and the outside air humidity decreased to approximately 50%, the cluster temperature decreased and the cluster humidity decreased as well. In the afternoon, by closing the side window 104 for keeping the heat in, the cluster temperature was able to be maintained higher than the outside air temperature, even though the outside air temperature decreased in the nighttime.

Note that, the exemplary measurement described above was taken in a case where the position of the environment sensor 24 that gives environment information to the control apparatus 30 was higher than the plants 1, and the temperature of the cluster of plants was able to be increased when the position of the environment sensor 24 was changed to a lower position than the height of the plants 1. It is desirable that, by setting a temperature range for the temperature of the cluster of plants (for example, the temperature appropriate for growth is set to 15 to 20° C.), the ventilation is adjusted such that the temperature of the cluster maintains in this range when performing dehumidification during the daytime on a sunny day. That is, it is desirable that the control apparatus 30 stops ventilation when the temperature reaches the lower limit of the temperature range during dehumidification. It is possible to set the time to start ventilation based on the time of sunset as a reference, other than setting to a fixed time.

As described above, even in the winter, it is possible to maintain the environment of the house body 10 in a condition appropriate for the growth of the plants 1 by the mist apparatus 212, the ceiling curtain 221, the side curtain 222, the airflow forming apparatus 23 (ventilation apparatus 231 and air blow tube 232), similarly to the summer.

In order to further suppress a temperature decrease of the plants 1 in the winter, a gap closer 16 for closing a gap formed with respect to the ground may be arranged at the lower end portion of the side wall portion 102 (and gable wall portion 103) of the house body 10 (refer to FIG. 3). Note that it is desirable that the gap closer 16 is configured by a tube that is formed by a material similar to the watering tube 213 and is filled with water in order to suppress cost increase. The gap closer 16 is easily carried if the water inside is drained, and when filled with water, the gap closer 16 stores heat by receiving sun light in the daytime and suppresses a decrease of the air temperature inside the house body 10 by discharging heat in the nighttime.

Incidentally, the ventilation apparatuses 231 are provided respectively to the gable wall portions 103 at the two ends of the house body 10 in the longitudinal direction, and are arranged so as to create airflow in a space formed below the ceiling curtain 221 in the house body 10. The ventilation apparatuses 231 are each arranged on the upper side of the gable wall portion 103 and below the ceiling curtain 221. In particular, the height position to which the ventilation apparatus 231 is arranged is set to be higher than the middle of the upper end and the lower end of the house body 10. Furthermore, it is desirable that the height position to which the ventilation apparatus 231 is arranged is set to be higher than the middle of the estimated upper end position of the plants 1 at the harvest time and the upper end of the ceiling curtain 221.

The ventilation apparatus 231 is arranged, when being operated in a state in which the side window 104 is opened, such that outside air is drawn from the side window 104 into the house body 10 due to airflow created in the house body 10. In a case where the ventilation apparatus 231 is a ventilation fan, airflow is created in a path connecting the side window 104 and the ventilation apparatus 231. On the other hand, in a case where the ventilation apparatus 231 is an air blower, outside air is drawn in from the side window 104 due to negative pressure when airflow is created inside the house body 10. The ventilation apparatus 231 may adopt either a configuration in which the air flow direction is fixed or a configuration in which a swing mechanism is included.

The control apparatus 30 is configured to operate the airflow forming apparatus 23 (ventilation apparatus 231 and air blow tube 232) for the purpose of dehumidification, cooling, ventilation, or the like, according to conditions such as temperature, humidity, and light intensity measured by the environment sensor 24. Although the control apparatus 30 causes the side window 104 to open in a period when the airflow forming apparatus 23 is operated in the exemplary configuration described above, it is possible to create various airflows that cannot be created merely by opening/closing the side window 104 by controlling opening/closing of the end window 105 in addition to the side window 104.

Incidentally, it is desirable that the two ventilation apparatuses 231 are arranged such that the positions thereof in the short direction are different, as shown in FIGS. 16A to 16D, instead of an arrangement in which the two ventilation apparatuses 231 oppose each other. That is, it is desirable that the two ventilation apparatuses 231 are arranged so as to be located on opposite sides to each other relative to the center line of the house body 10 along the longitudinal direction, and are arranged such that the distances between the center line and the respective ventilation apparatuses 231 are the same. When the ventilation apparatuses 231 are arranged in this way, the airflow distribution in the short direction of the house body 10 will be symmetrical.

In this arrangement, the end window 105 is arranged on the side opposite to the ventilation apparatus 231 in the short direction of the house body 10. That is, since the ventilation apparatus 231 and the end window 105 respectively face the end window 105 and the ventilation apparatus 231 provided in the other gable wall portion 103, airflows 51 and 52 that flow in a substantially straight line along the longitudinal direction of the house body 10 are created by opening the end windows 105 when the ventilation apparatuses 231 are operated. Also, if the side windows 104 are opened as well in this state, the outside air is drawn into the house body 10 through the side window 104, due to negative pressure caused by the airflows 51 and 52 created between the ventilation apparatuses 231 and the end windows 105. That is, the air inside the house body 10 can be quickly ventilated. Also, since airflow is created above the plants 1, the air in the vicinity of the plants 1 is suctioned, and a mild airflow 53 is created in the vicinity of the plants 1. As a result, dehumidification and cooling in the vicinity of the plants 1 can be performed quickly with the mild airflow 53 without damaging the plants 1, since air is not blown directly onto the plants 1.

In FIGS. 16A and 16B, arrows indicate the directions of the airflows 51 to 53. As a result of the linear airflows 51 and 52 that are formed by the ventilation apparatuses 231, the outside air is drawn in through the side windows 104, as shown in FIG. 16A, and airflow in the vicinity of the plants 1 is also induced, as shown in FIG. 16B. Note that, in FIG. 16B, since the ventilation apparatus 231 on the left side is arranged at further back than the ventilation apparatus 231 on the right side, and the illustrated plants 1 are planted on the near side, the airflow 53 in the vicinity of the plants 1 is induced by the airflow 51 formed by the ventilation apparatus 231 on the right side.

It is desirable that the position of the ventilation apparatus 231 is adjustable relative to the house body 10. For example, such a configuration is realized by configuring the ventilation apparatus 231 with a body apparatus that forms the airflow 51 or airflow 52 and a mounting frame that is fixed to the gable wall portion 103, and by making the position at which the main apparatus is mounted to the mounting frame variable.

Figure 17:
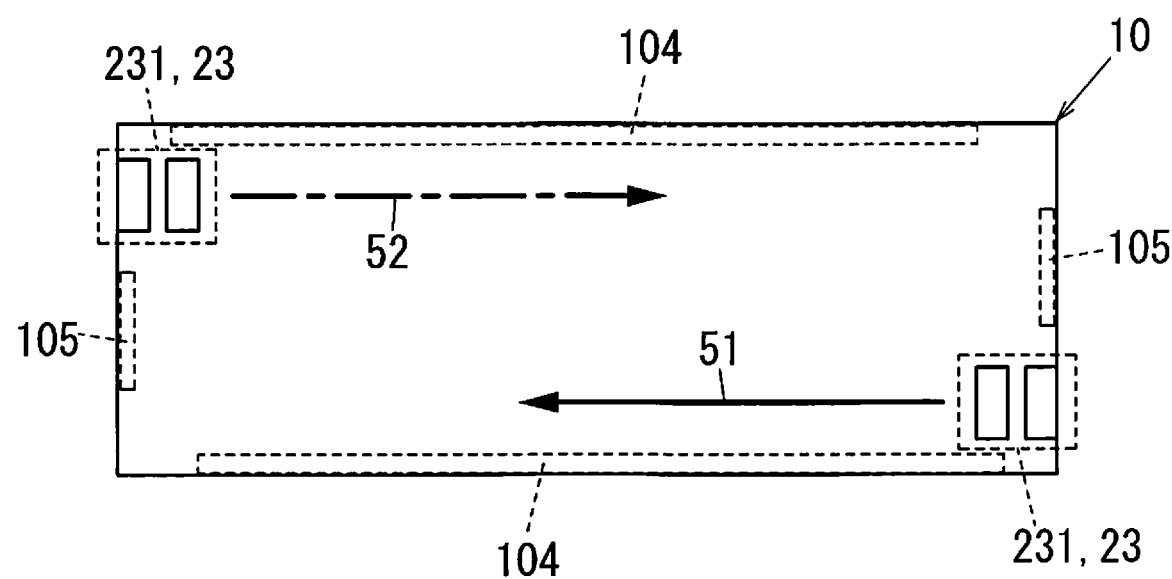
FIG. 17 is a schematic diagram illustrating an exemplary configuration of the ventilation apparatus used in the agricultural house according to the embodiment.

The ventilation apparatus 231 may be configured by a plurality of ventilation fans or air blowers that are stacked viewed from the longitudinal direction, as shown in FIG. 17. In FIG. 17, each of two rectangles enclosed by broken lines denotes a ventilation fan or an air blower. The ventilation fan or the air blower includes an axial flow fan as described above. The plurality of ventilation fans or air blowers that are stacked to form the ventilation apparatus 231 are arranged such that shaft lines of the rotating shafts of the axial flow fans are located on a straight line.

Figure 18:
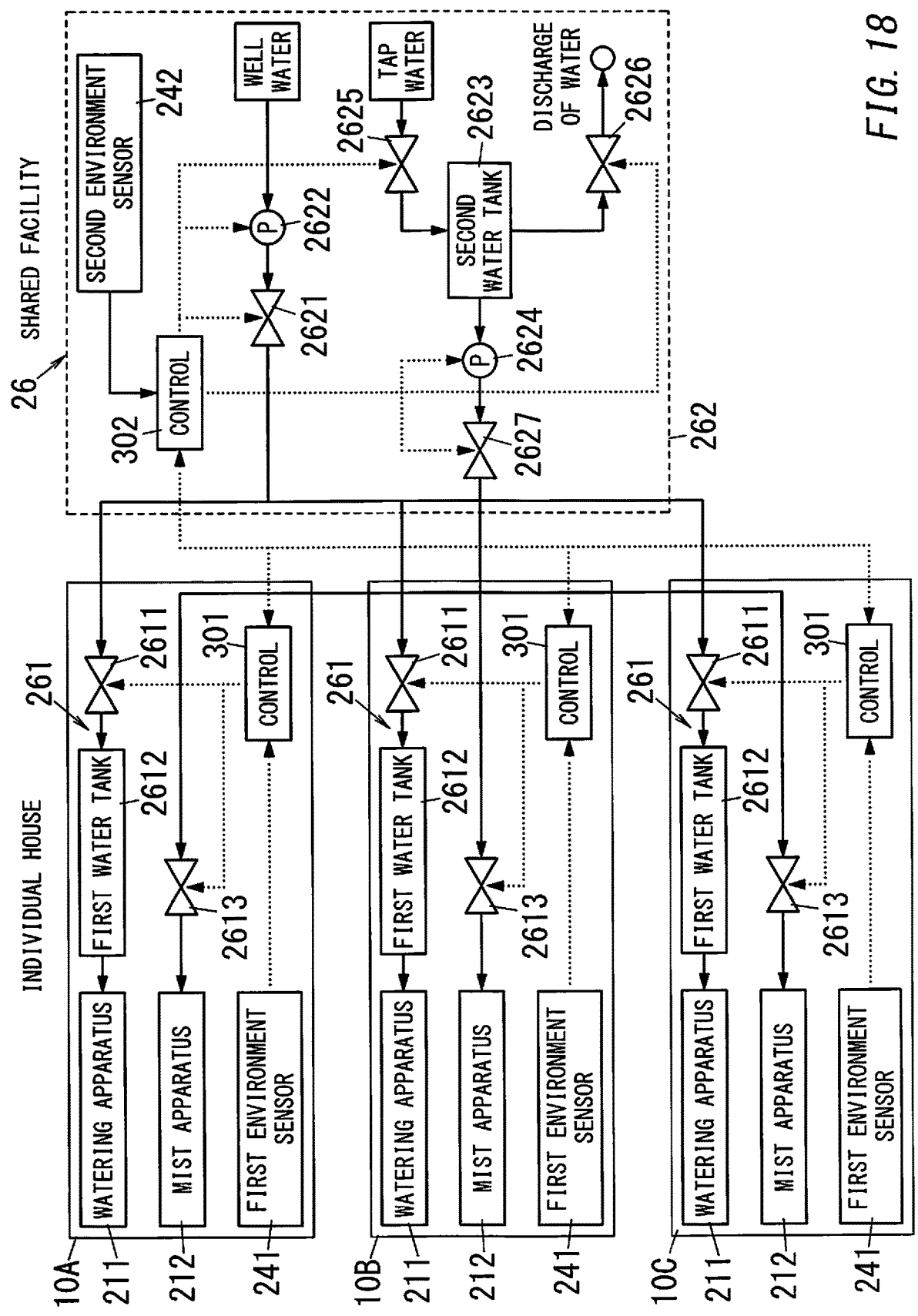
FIG. 18 is a schematic configuration diagram illustrating another exemplary configuration of the agricultural house according to the embodiment.

In the exemplary configuration described above, although a description was given with regard to one house body 10, there are cases where a plurality of house bodies 10A to 10C are provided side by side, as shown in FIG. 18. In the case where the plurality of house bodies 10A to 10C are provided side by side, there are cases where plants 1 of the same type are grown in all the house bodies 10A to 10C, and there are cases where different plants 1 are grown in the respective house bodies 10A to 10C. In either case, there is a problem in that costs increase if the water pump 217, the water storage tank 218, and the like, that constitute the water supply apparatus 21 are installed in each of the house bodies 10A to 10C, in the case where the plurality of house bodies 10A to 10C are provided side by side.

In view of this, as shown in FIG. 18, the water supply facility 26 that supplies water to the watering apparatus 211 and the mist apparatus 212 that are provided in each of the house bodies 10A to 10C is divided into a first water supply facility 261 provided in each of the house bodies 10A to 10C and a second water supply facility 262 independent from the house bodies 10A to 10C. The second water supply facility 262 is shared at least among the watering apparatuses 211 or among the mist apparatuses 212 that are provided in the plurality of house bodies 10A to 10C.

In an exemplary configuration shown in FIG. 18, the first water supply facility 261 and the second water supply facility 262 each include an apparatus inserted in a path for supplying water to the watering apparatus 211 and an apparatus inserted in a path for supplying water to the mist apparatus 212.

In the first water supply facility 261, an on-off valve 2611 and a first water storage tank 2612 are inserted in the path for supplying water to the watering apparatus 211, and only an on-off valve 2613 is inserted in the path for supplying water to the mist apparatus 212.

On the other hand, in the second water supply facility 262, an on-off valve 2621 and a water pump 2622 for pressurization are inserted in the path for supplying water to the watering apparatus 211. The apparatus inserted in the path for supplying water to the mist apparatus 212 includes a second water storage tank 2623 and a water pump 2624 for pressurization. An on-off valve 2625 that controls supplying water to the second water storage tank 2623 and an on-off valve 2626 that controls the discharge of water from the second water storage tank 2623 are connected to the second water storage tank 2623. An on-off valve 2627 is inserted in the path for supplying water from the water pump 2624 to the house bodies 10A to 10C.

Similarly to the water supply facility 26, the control apparatus 30 is divided into a first control apparatus 301 that is provided in each of the house bodies 10A to 10C and a second control apparatus 302 that is independent from the house bodies 10A to 10C. The first control apparatus 301 controls on-off states of the on-off valves 2611 and 2613 provided in the first water supply facility 261. Also, the second control apparatus 302 is configured to control on-off states of the on-off valves 2621 and 2625 to 2627 that are provided in the second water supply facility 262 and operating states of the water pumps 2622 and 2624. Note that, in the illustrated example, a first environment sensor 241 is arranged in each of the house bodies 10A to 10C, and a second environment sensor 242 that is commonly used by all the house bodies 10A to 10C is provided independently from the house bodies 10A to 10C. The first environment sensors 241 are configured to measure temperature, humidity, and light intensity inside the house bodies 10A to 10C. The second environment sensor 242 is configured to measure temperature, humidity, and light intensity outside the house bodies 10A to 10C. The information gathered by the first environment sensor 241 is used in the first control apparatus 301, and the information gathered by the second environment sensor 242 is used in the second control apparatus 302.

Signal paths relating to the first control apparatuses 301 and the second control apparatus 302 are omitted in FIG. 18. Also, in the illustrated example, although well water is supplied to the watering apparatus 211, and city water (tap water) is supplied to the mist apparatus 212, water supplied to the watering apparatus 211 and the mist apparatus 212 is selected appropriately as described above.

In the configuration shown in FIG. 18, the first water storage tank 2612 is configured to secure an amount of water to be supplied to the watering apparatus 211 in each of the house bodies 10A to 10C. On the other hand, since the second water storage tank 2623 is shared by the mist apparatuses 212 provided in the plurality of house bodies 10A to 10C, there is possibility that there will be an increase in the capacity of the second water storage tank 2623 if the number of house bodies 10A to 10C increases. In order to prevent an increase in the size of the second water storage tank 2623, the second control apparatus 302 supplies water to each of an appropriate number of house bodies 10A to 10C in turn, in the case where the second control apparatus 302 cannot supply water to the plurality of house bodies 10A to 10C at the same time. In order to perform this operation, the second control apparatus 302 cooperates through communicating with the first control apparatus 301.

For example, a case is assumed where the second water storage tank 2623 can supply water to two house bodies among the house bodies 10A to 10C at the same time, and cannot supply water to the three house bodies 10A to 10C at the same time. In this case, the second control apparatus 302 performs control such that water is supplied to two house bodies among the house bodies 10A to 10C, and then water is supplied to the remaining house body after completion of water supply to the two house bodies.

As shown in this example, by shifting the timing for supplying water to each of the house bodies 10A to 10C from the second water storage tank 2623, it becomes possible to supply water to a plurality of house bodies 10A to 10C without increasing the size of the second water storage tank 2623. Also, a configuration corresponding to the second water storage tank 2623, and configurations corresponding to the water pumps 2622 and 2624 need not be provided in each of the house bodies 10A to 10C. As a result, even in a case where a plurality of house bodies 10A to 10C are provided side by side, a cost increase can be suppressed, and an increase in size of the water supply facility 26 that is shared can be avoided.

As described above, a part of the water supply facility 26 (the second water supply facility 262) is shared by the plurality of house bodies 10A to 10C. Furthermore, the control apparatus 30 (second control apparatus 302) selects a target for supplying water from the water supply facility 26 among the house bodies based on a relationship between the watering capacity of the water supply facility 26 and the amount of water required in the house bodies 10A to 10C. Also, when the total amount of water required in the house bodies 10A to 10C exceeds the watering capacity of the water supply facility 26, the control apparatus 30 (second control apparatus 302) can perform control such that the water supply facility 26 supplies water to the house bodies 10A to 10C in turn.

Note that the embodiment described above is an example of the present invention. The present invention is not limited to the embodiment described above, and it should be obvious that, in addition to the above embodiment, various modifications can be made according to the design or the like, as long as they do not depart from the technical idea of the present invention.

The invention claimed is:

1. An agricultural house, comprising:
at least one house body in which a covering material having translucency is supported by a frame, and an internal space for plant growth is formed inside the at least one house body;
an environment forming apparatus comprising a water supply apparatus that is configured to supply water from above to a cluster of plants grown inside the house body and control an ambient temperature of the plants, the environment forming apparatus being configured to form an environment in which the plants are grown;
a plurality of environment sensors configured to detect environment information comprising the ambient temperature of the plants in the internal space; and
a control apparatus including storage and configured to acquire the environment information from the plurality of environment sensors, and control at least one of a timing of watering and an amount of watering by the water supply apparatus according to the environment information, so as to obtain a temperature and a humidity appropriate for growth of the plants,
wherein the control apparatus is configured to perform the watering by driving the water supply apparatus in a watering period determined according to the environment information, and prohibit the watering by the water supply apparatus in an idle period after the watering period, the watering period and the idle period being based upon a growth stage of the plants, and
wherein each of the plurality of environment sensors is positioned at a different height than other of the plurality of environment sensors, the different height position of each of the plurality of environment sensors corresponding to the height of a plant at a particular stage in growth, and wherein the storage of the control apparatus associates both a growth timing prior to the sprouting of the plants and a number of days that have elapsed since the sprouting of the plants with the plurality of environment sensors each having the different height position.

2. The agricultural house according to claim 1, wherein the control apparatus is configured to change a control content for controlling the environment forming apparatus according to a season.

3. The agricultural house according to claim 2, further comprising a temperature sensor for measuring a temperature outside the house body,
wherein the control apparatus is configured to determine the season based on a lowest temperature that the temperature sensor measures until sunrise of a current day in which the outside temperature is measured.

4. The agricultural house according to claim 2, wherein the control apparatus is configured to set the at least one of the timing of watering and the amount of watering by the water supply apparatus during winter, such that the ambient temperature of the plants becomes higher than a temperature appropriate for growth of the plants.

5. The agricultural house according to claim 2, wherein the control apparatus is configured to change the control content for controlling the environment forming apparatus according to a time slot.

6. The agricultural house according to claim 1, wherein the control apparatus is configured to change the idle period according to a growth stage of the plants.

7. The agricultural house according to claim 1, wherein the control apparatus is configured to change the amount of watering by the water supply apparatus according to a growth stage of the plant.

8. The agricultural house according to claim 1,
wherein the water supply apparatus comprises:
a watering apparatus that is configured to perform watering so that water is applied directly to the plants; and
a mist apparatus that is configured to spray water into a space above the plants.

9. The agricultural house according to claim 8,
wherein the at least one house body comprises a plurality of house bodies; and
wherein the agricultural house further comprises a water supply facility configured to supply water to at least one of the watering apparatus and the mist apparatus that are arranged in each of the plurality of house bodies, and to be shared by the plurality of house bodies.

10. The agricultural house according to claim 9, wherein the control apparatus is configured to select at least one house body to be a target for supplying water from the water supply facility among the plurality of house bodies, according to a relationship between a watering capability of the water supply facility and a water amount needed for each of the plurality of house bodies.

11. The agricultural house according to claim 10, wherein, when the at least one house body to be the target for supplying water from the water supply facility includes the plurality of house bodies to be targets for supplying water from the water supply facility, the control apparatus causes the water supply facility to supply water to the house bodies to be the targets for supplying water from the water supply facility in turn, in a case where a total amount of water needed for the house bodies to be the targets for supplying water from the water supply facility exceeds a water supply capacity of the water supply facility.

12. The agricultural house according to claim 1, wherein the control apparatus is configured to acquire the environment information from the environment sensor at a position corresponding to an increased height of the plants resulting from a growth stage of the plants.

13. The agricultural house according to claim 1,
wherein the environment forming apparatus further comprises an airflow forming apparatus configured to form airflow inside the house body in a vicinity of the plants, and
wherein the control apparatus is configured to control an operation of the airflow forming apparatus in accordance with the at least one of the timing of watering and the amount of watering by the water supply apparatus.

14. The agricultural house according to claim 1,
wherein the environment forming apparatus further comprises at least one airflow forming apparatus configured to form airflow inside the house body in a vicinity of the plants, and
wherein the control apparatus causes the at least one airflow forming apparatus to operate regularly during winter in a range in which the ambient temperature of the plants is maintained at least at a predetermined temperature.

15. The agricultural house according to claim 14,
wherein the house body integrally comprises:
a pair of side wall portions opposing each other, a roof portion extending across the pair of side wall portions; and
a pair of gable wall portions opposing each other and intersecting the pair of side wall portions,
wherein the environment forming apparatus further comprises an openable/closable side window that is provided in at least one of the pair of side wall portions, and
wherein the at least one airflow forming apparatus is mounted to at least one of the pair of gable wall portions, and is configured to draw in outside air from the side window when the side window is open, by forming airflow in the house body in a direction passing through the pair of gable wall portions.

16. The agricultural house according to claim 15,
wherein each of the pair of gable wall portions is provided with an openable/closable end window,
wherein the at least one airflow forming apparatus is provided as a pair of airflow forming apparatuses each of which is mounted to a corresponding one of the pair of gable wall portions, and
wherein the pair of airflow forming apparatuses are located on opposite sides to each other relative to a center line along a direction passing through the pair of gable wall portions in the house body, and are each arranged so as to face the end window provided in the opposing gable wall portion.

17. The agricultural house according to claim 15,
wherein the environment forming apparatus further comprises a curtain that is driven openably/closably between a closed state in which outside light irradiated onto the plants is reduced and an open state in which the outside light irradiated onto the plants is not blocked, and
wherein the at least one airflow forming apparatus is arranged above the plants, and, in the closed state of the curtain, is positioned on an opposite side to the roof portion with the curtain interposed therebetween.

18. The agricultural house according to claim 16,
wherein the side window and the end window are driven openably/closably, and
wherein the control apparatus is configured to control opening/closing of the side window, opening/closing of the end window, and an operation of the pair of airflow forming apparatuses, based on the environment information detected by the environment sensor.

19. The agricultural house according to claim 15,
wherein the at least one airflow forming apparatus mounted to the at least one of the gable wall portions comprises:
a body apparatus configured to form the airflow, and
a mounting frame that is fixed to the at least one of the gable wall portions, and in which a position to which the body apparatus is coupled to the mounting frame is changeable.

20. The agricultural house according to claim 15,
wherein the at least one airflow forming apparatus mounted to the at least one of the gable wall portions comprises a plurality of ventilation fans or air blowers each having an axial flow fan, and axis lines of rotating axes of the axial flow fans are arranged on a straight line.

* * * * *